United States Patent
Yuan et al.

(10) Patent No.: US 12,197,678 B2
(45) Date of Patent: *Jan. 14, 2025

(54) SIGNAL DRIVING METHOD, SIGNAL DRIVING APPARATUS AND TOUCH CONTROL CHIP PRELIMINARY CLASS

(71) Applicant: Shenzhen Goodix Technology Co., Ltd., Guangdong (CN)

(72) Inventors: Guangkai Yuan, Guangdong (CN); Guanliang Liao, Guangdong (CN); Xianghua Li, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 5 days.

This patent is subject to a terminal disclaimer.

(21) Appl. No.: 18/169,858

(22) Filed: Feb. 15, 2023

(65) Prior Publication Data
US 2023/0195260 A1 Jun. 22, 2023

Related U.S. Application Data

(63) Continuation of application No. 17/492,602, filed on Oct. 2, 2021, now Pat. No. 11,620,018.

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0442* (2019.05)

(58) Field of Classification Search
CPC ........ G06F 3/0354; G06F 3/038; G06F 3/041; G06F 3/044
See application file for complete search history.

(56) References Cited

U.S. PATENT DOCUMENTS 10,007,379 B2 * 6/2018 Oke ...................... G06F 3/0446
10,216,333 B2    2/2019 Zyskind et al.
(Continued)

FOREIGN PATENT DOCUMENTS

CN    101479692 A    7/2009
CN    102087565 A    6/2011
(Continued)

OTHER PUBLICATIONS

Shenzhen Goodix Technology Co.,Ltd., Notice of Allowance, U.S. Appl. No. 17/492,602, filed Dec. 21, 2022, 10 pgs.
(Continued)

*Primary Examiner* — Olga V Merkoulova
(74) *Attorney, Agent, or Firm* — USCH Law, PC

(57) ABSTRACT

A signal driving method is provided. The method includes, in a first signal driving period, applying non-inverting and inverting drive signals respectively to M adjacent and N adjacent detection electrodes, where M+N≤P; and in a second signal driving period, applying the non-inverting and inverting drive signals respectively to K adjacent and L adjacent detection electrodes, where K+L≤P. P denotes a number of detection electrodes not greater than a number of detection electrodes on a touch control screen. M, N, K and L adjacent detection electrodes are all part of the P detection electrodes. One signal driving cycle includes at least the first and second signal driving periods in which drive signals are applied to P detection electrodes. Each P detection electrode is applied a non-inverting drive signal at least once in one signal driving cycle, and phases of the inverting and non-inverting drive signals are opposite to each other by 180 degrees.

20 Claims, 10 Drawing Sheets

(56) References Cited

U.S. PATENT DOCUMENTS

| | | | |
|---|---|---|---|
| 11,620,018 B2* | 4/2023 | Yuan | G06F 3/0441 345/156 |
| 2013/0169601 A1 | 7/2013 | Mo et al. | |
| 2015/0049045 A1 | 2/2015 | Yousefpor | |
| 2016/0357329 A1* | 12/2016 | Oke | G02F 1/136286 |
| 2018/0121015 A1 | 5/2018 | Yeh et al. | |
| 2019/0004664 A1 | 1/2019 | Zyskind et al. | |
| 2019/0102037 A1* | 4/2019 | Krah | G06F 3/0418 |
| 2020/0026369 A1* | 1/2020 | Hisano | G06F 3/03545 |
| 2020/0050339 A1 | 2/2020 | Choi et al. | |
| 2020/0117255 A1 | 4/2020 | Bentov | |
| 2020/0159382 A1 | 5/2020 | Drumm | |

FOREIGN PATENT DOCUMENTS

| | | |
|---|---|---|
| CN | 105389064 A | 3/2016 |
| CN | 105807990 A | 7/2016 |
| CN | 107003775 A | 8/2017 |
| CN | 108064344 A | 5/2018 |
| CN | 108124464 A | 6/2018 |
| CN | 108124499 A | 6/2018 |
| CN | 108351731 A | 7/2018 |
| CN | 110175261 A | 8/2019 |
| CN | 110321017 A | 10/2019 |
| CN | 110832447 A | 2/2020 |
| CN | 111095173 A | 5/2020 |
| JP | 2007286836 A | 11/2007 |
| JP | 2020021518 A | 2/2020 |
| KR | 20170035305 A | 3/2017 |
| KR | 20200025573 A | 3/2020 |
| TW | 201327336 A | 7/2013 |
| TW | 201843569 A | 12/2018 |
| WO | 2016125962 A1 | 8/2016 |
| WO | 2018035843 A1 | 3/2018 |
| WO | 2019067267 A1 | 4/2019 |
| WO | 2019087332 A1 | 5/2019 |

OTHER PUBLICATIONS

Shenzhen Goodix Technology Co.,Ltd., International Search Report with English translation, PCT/CN2020/096117, Mar. 12, 2021, 7pgs.

Shenzhen Goodix Technology Co.,Ltd., Extended European Search Report, EP 20926361.5, Apr. 19, 2022, 10 pgs.

Shenzhen Goodix Technology Co.,Ltd., CN First Office Action with English translation, CN 202010542770.4, Aug. 4, 2020, 11pgs.

Shenzhen Goodix Technology Co.,Ltd., CN Intention to Grant with English translation, CN 202010542770.4, Aug. 24, 2020, 7pgs.

Shenzhen Goodix Technology Co.,Ltd., CN Intention to Grant with English translation, CN 202011242463.0, Apr. 8, 2022, 8pgs.

Gongjin Fan, Design and Analysis of In-Cell Capacitive Touch Sensor, China Master's Theses Full-text Database, Jan. 15, 2019, 80pgs.

Hao Cai et al., Reduction of crosstalk between TFT-LCD and capacitive touch panel, Chinese Journal of Liquid Crystals and Displays, Jun. 15, 2018, 7pgs.

Rui Mao et al., Research on the Improvement Scheme of Electronic Stylus Based on Mobile Terminal, China New Telecommunications, Jun. 6, 2018, 3pgs.

* cited by examiner

SIGNAL DRIVING METHOD, SIGNAL DRIVING APPARATUS AND TOUCH CONTROL CHIP PRELIMINARY CLASS

CROSS REFERENCE TO RELATED APPLICATIONS

The present application is a continuation of U.S. patent application Ser. No. 17/492,602, filed on Oct. 2, 2021, which is a continuation of PCT Patent Application No. PCT/CN2020/096117, filed on Jun. 15, 2020, each of which is incorporated herein by reference in its entirety.

TECHNICAL FIELD

The present disclosure relates to the field of information technology, in particular to a signal driving method, a signal driving apparatus and a touch control chip.

BACKGROUND

Currently, as a main peripheral input accessory of an electronic device, an active pen gradually receives attention from the market. A certain number of detection electrodes are distributed on a touch control screen in the horizontal direction and vertical direction. Therefore, an uplink spreading signal may be sent by the detection electrode to the active pen. After synchronization with the active pen is established, a downlink signal is sent from a tip of the active pen through the detection electrode, and two-dimensional position coordinates of the tip of the active pen on the touch control screen is calculated according to the downlink signal.

The inventor found that various forms of display ripples appear on the display when using the active pen to operate the electronic device, which sometimes move forward like water ripples, sometimes present few moving bright lines, or sometimes appear at times. These phenomena are collectively referred to as Moire phenomenon. Therefore, it is urgent that how to effectively solve Moire phenomenon on the display.

SUMMARY

The present disclosure provides a signal driving method, a signal driving apparatus and a touch control chip, which may effectively solve Moire phenomenon appearing on a display.

In one aspect, the present disclosure provides a signal driving method, wherein one signal driving cycle includes two signal driving periods in which drive signals are applied to P detection electrodes, and the method includes: in a first signal driving period, applying non-inverting drive signals to M adjacent detection electrodes and applying inverting drive signals to N adjacent detection electrodes, wherein the non-inverting drive signals applied to the M adjacent detection electrodes and the inverting drive signals applied to the N adjacent detection electrodes cancel each other out, $M+N \leq P$ and $|M-N| \leq Q$; and in a second signal driving period, applying the non-inverting drive signals to K adjacent detection electrodes and applying the inverting drive signals to L adjacent detection electrodes, wherein the non-inverting drive signals applied to the K adjacent detection electrodes and the inverting drive signals applied to the L adjacent detection electrodes cancel each other out, $K+L \leq P, |K-L| \leq Q$ and $M+K \geq P$; wherein Q denotes a number of detection electrodes which makes an active pen not cause moire after the cancelling, and P denotes a number of detection electrodes not greater than a number of detection electrodes on a touch control screen.

According to the first aspect, in a possible implementation, the detection electrodes are horizontal detection electrodes or longitudinal detection electrodes, and P denotes a number of the horizontal detection electrodes or a number of the longitudinal detection electrodes.

According to the first aspect, in a possible implementation, a number of detection electrodes to which the non-inverting drive signals are applied in the two signal driving periods is greater than or equal to 1.

According to the first aspect, in a possible implementation, code, the method further includes: in the first signal driving period, not applying the drive signals to I detection electrodes; in the second signal driving period, not applying the drive signals to O detection electrodes; wherein the I detection electrodes are located between the M adjacent detection electrodes and the N adjacent detection electrodes, and the O detection electrodes are located between the K adjacent detection electrodes and the L adjacent detection electrodes.

According to the first aspect, in a possible implementation, $I=1$ and $Q=1$.

According to the first aspect, in a possible implementation, $Q=2$ or $Q=1$.

According to the first aspect, in a possible implementation, $M-N=K-L$.

In a second aspect, another signal driving method is provided, wherein one signal driving cycle includes three signal driving periods in which drive signals are applied to P detection electrodes, and the method includes: in a first signal driving period, applying non-inverting drive signals to M adjacent detection electrodes, applying inverting drive signals to N adjacent detection electrodes, and not applying the drive signals to B detection electrodes, wherein the non-inverting drive signals applied to the M adjacent detection electrodes and the inverting drive signals applied to the N adjacent detection electrodes cancel each other out, $M+N+B=P$ and $|M-N| \leq Q$; in a second signal driving period, applying the non-inverting drive signals to K adjacent detection electrodes, applying the inverting drive signals to L adjacent detection electrodes, and not applying the drive signals to J detection electrodes, wherein the non-inverting drive signals applied to the K adjacent detection electrodes and the inverting drive signals applied to the L adjacent detection electrodes cancel each other out, $K+L+J=P$ and $|K-L| \leq Q$; and in a third signal driving period, applying the non-inverting drive signals to G adjacent detection electrodes, applying the inverting drive signals to H adjacent detection electrodes, and not applying the drive signals to F detection electrodes, wherein the non-inverting drive signals applied to the G adjacent detection electrodes and the inverting drive signals applied to the H adjacent detection electrodes cancel each other out, $G+H+F=P$, $|G-H| \leq Q$ and $M+K+H \geq P$; wherein Q denotes a number of detection electrodes after the cancelling which makes an active pen not cause moire, and P denotes a number of detection electrodes not greater than a number of detection electrodes on a touch control screen.

According to the second aspect, in a possible implementation, the P detection electrodes are horizontal detection electrodes or longitudinal detection electrodes, and P denotes a number of the horizontal detection electrodes or a number of the longitudinal detection electrodes.

According to the second aspect, in a possible implementation, a number of detection electrodes to which the non-inverting drive signals are applied in two of the three signal driving periods is greater than or equal to 2.

According to the second aspect, in a possible implementation, the method further includes: in the first signal driving period, not applying the drive signals to I detection electrodes, wherein the I detection electrodes are located between the M adjacent detection electrodes and the N adjacent detection electrodes; in the second signal driving period, not applying the drive signals to O detection electrodes, wherein the O detection electrodes are located between the K adjacent detection electrodes and the L adjacent detection electrodes; and in the third signal driving period, not applying the drive signals to Z detection electrodes, wherein the Z detection electrodes are located between the G adjacent detection electrodes and the H adjacent detection electrodes; wherein I<B, O<J and Z<F.

According to the second aspect, in a possible implementation, I=1, O=1 and Z=1.

According to the second aspect, in a possible implementation, Q=2 or Q=1.

According to the second aspect, in a possible implementation, M−N=K−L=G−H.

In a third aspect, another signal driving method is provided, wherein one signal driving cycle includes four signal driving periods in which drive signals are applied to P detection electrodes, and the method includes: in a first signal driving period, applying non-inverting drive signals to M adjacent detection electrodes, applying inverting drive signals to N adjacent detection electrodes, and not applying the drive signals to B detection electrodes, wherein the non-inverting drive signals applied to the M adjacent detection electrodes and the inverting drive signals applied to the N adjacent detection electrodes cancel each other out, M+N+B=P and |M−N|≤Q; in a second signal driving period, applying the non-inverting drive signals to K adjacent detection electrodes, applying the inverting drive signals to L adjacent detection electrodes, and not applying the drive signals to J detection electrodes, wherein the non-inverting drive signals applied to the K adjacent detection electrodes and the inverting drive signals applied to the L adjacent detection electrodes cancel each other out, K+L+J=P and |K−L|≤Q; in a third signal driving period, applying the non-inverting drive signals to G adjacent detection electrodes, applying the inverting drive signals to H adjacent detection electrodes, and not applying the drive signals to F detection electrodes, wherein the non-inverting drive signals applied to the G adjacent detection electrodes and the inverting drive signals applied to the H adjacent detection electrodes cancel each other out, G+H+F=P and |G−H|≤Q; and in a fourth signal driving period, applying the non-inverting drive signals to T adjacent detection electrodes, applying the inverting drive signals to Y adjacent detection electrodes, and not applying the drive signals to U detection electrodes, wherein the non-inverting drive signals applied to the T adjacent detection electrodes and the inverting drive signals applied to the Y adjacent detection electrodes cancel each other out, T+Y+U=P, |T−Y|≤Q and M+K+H+T≥P; wherein Q denotes a number of detection electrodes after the cancelling which makes an active pen not cause moire, and P denotes a number of detection electrodes not greater than a number of detection electrodes on a touch control screen.

According to the third aspect, in a possible implementation, the P detection electrodes are horizontal detection electrodes or longitudinal detection electrodes, and P denotes a number of the horizontal detection electrodes or a number of the longitudinal detection electrodes.

According to the third aspect, in a possible implementation, a number of detection electrodes to which the non-inverting drive signals are applied in two of the four signal driving periods is greater than or equal to 3.

According to the third aspect, in the first signal driving period, the method further includes: in the first signal driving period, not applying the drive signals to I detection electrodes, wherein the I detection electrodes are located between the M adjacent detection electrodes and the N adjacent detection electrodes; in the second signal driving period, not applying the drive signals to O detection electrodes, wherein the O detection electrodes are located between the K adjacent detection electrodes and the L adjacent detection electrodes; in the third signal driving period, not applying the drive signals to Z detection electrodes, wherein the Z detection electrodes are located between the G adjacent detection electrodes and the H adjacent detection electrodes; and in the fourth signal driving period, not applying the drive signals to W detection electrodes, wherein the W detection electrodes are located between the T adjacent detection electrodes and the Y adjacent detection electrodes; wherein I<B, O<J, Z<F and W<U.

According to the third aspect, in a possible implementation, I=1, O=1, Z=1 and W=1.

According to the third aspect, in a possible implementation, M−N=K−L=G−H=T−Y.

In a fourth aspect, a signal driving apparatus is provided, wherein one signal driving cycle includes two signal driving periods in which drive signals are applied to P detection electrodes, and the apparatus includes: a signal driving module, configured to: in a first signal driving period, apply non-inverting drive signals to M adjacent detection electrodes and apply inverting drive signals to N adjacent detection electrodes, wherein the non-inverting drive signals applied to the M adjacent detection electrodes and the inverting drive signals applied to the N adjacent detection electrodes cancel each other out, M+N≤P and |M−N|≤Q; and in a second signal driving period, apply the non-inverting drive signals to K adjacent detection electrodes and apply the inverting drive signals to L adjacent detection electrodes, wherein the non-inverting drive signals applied to the K adjacent detection electrodes and the inverting drive signals applied to the L adjacent detection electrodes cancel each other out, K+L≤P, |K−L|≤Q and M+K≥P; wherein Q denotes a number of detection electrodes after the cancelling which makes an active pen not cause moire, and P denotes a number of detection electrodes not greater than a number of detection electrodes on a touch control screen.

According to the fourth aspect, in a possible implementation, the P detection electrodes are horizontal detection electrodes or longitudinal detection electrodes, and P denotes a number of the horizontal detection electrodes or a number of the longitudinal detection electrodes.

According to the fourth aspect, in a possible implementation, a number of detection electrodes to which the non-inverting drive signals are applied in the two signal driving periods is greater than or equal to 1.

According to the fourth aspect, in a possible implementation, the signal driving module is further configured to: in the first signal driving period, not apply the drive signals to I detection electrodes; in the second signal driving period, not apply the drive signals to O detection electrodes; wherein the I detection electrodes are located between the M adjacent detection electrodes and the N adjacent detection electrodes, and the O detection electrodes are located between the K adjacent detection electrodes and the L adjacent detection electrodes.

According to the fourth aspect, in a possible implementation, I=1 and O=1.

According to the fourth aspect, in a possible implementation, Q=2 or Q=1.

According to the fourth aspect, in a possible implementation, M−N=K−L.

In a fifth aspect, a signal driving apparatus is provided, wherein one signal driving cycle includes three signal driving periods in which drive signals are applied to P detection electrodes, and the apparatus includes: a signal driving module, configured to: in a first signal driving period, apply non-inverting drive signals to M adjacent detection electrodes, apply inverting drive signals to N adjacent detection electrodes, and not apply the drive signals to B detection electrodes, wherein the non-inverting drive signals applied to the M adjacent detection electrodes and the inverting drive signals applied to the N adjacent detection electrodes cancel each other out, M+N+B=P and |M−N|≤Q; in a second signal driving period, apply the non-inverting drive signals to K adjacent detection electrodes, apply the inverting drive signals to L adjacent detection electrodes, and not apply the drive signals to J detection electrodes, wherein the non-inverting drive signals applied to the K adjacent detection electrodes and the inverting drive signals applied to the L adjacent detection electrodes cancel each other out, K+L+J=P and |K−L|≤Q; and in a third signal driving period, apply the non-inverting drive signals to G adjacent detection electrodes, apply the inverting drive signals to H adjacent detection electrodes, and not apply the drive signals to F detection electrodes, wherein the non-inverting drive signals applied to the G adjacent detection electrodes and the inverting drive signals applied to the H adjacent detection electrodes cancel each other out, G+H+F=P, |G−H|≤Q and M+K+H≥P; wherein Q denotes a number of detection electrodes after the cancelling which makes an active pen not cause moire, and P denotes a number of detection electrodes not greater than a number of detection electrodes on a touch control screen.

According to the fifth aspect, in a possible implementation, the detection electrodes are horizontal detection electrodes or longitudinal detection electrodes, and P denotes a number of the horizontal detection electrodes or a number of the longitudinal detection electrodes.

According to the fifth aspect, in a possible implementation, a number of detection electrodes to which the non-inverting drive signals are applied in two of the three signal driving periods is greater than or equal to 2.

According to the fifth aspect, in a possible implementation, the signal driving module is further configured to: in the first signal driving period, not apply the drive signals to I detection electrodes, wherein the I detection electrodes are located between the M adjacent detection electrodes and the N adjacent detection electrodes; in the second signal driving period, not apply the drive signals to O detection electrodes, wherein the O detection electrodes are located between the K adjacent detection electrodes and the L adjacent detection electrodes; and in the third signal driving period, not apply the drive signals to Z detection electrodes, wherein the Z detection electrodes are located between the G adjacent detection electrodes and the H adjacent detection electrodes; wherein I<B, O<J and Z<F.

According to the fifth aspect, in a possible implementation, I=1, O=1 and Z=1.

According to the fifth aspect, in a possible implementation, Q=2 or Q=1.

According to the fifth aspect, in a possible implementation, M−N=K−L=G−H.

In a sixth aspect, another signal driving apparatus is provided, wherein one signal driving cycle includes four signal driving periods in which drive signals are applied to P detection electrodes, and the apparatus includes: a signal driving module, configured to: in a first signal driving period, apply non-inverting drive signals to M adjacent detection electrodes, apply inverting drive signals to N adjacent detection electrodes, and not apply the drive signals to B detection electrodes, wherein the non-inverting drive signals applied to the M adjacent detection electrodes and the inverting drive signals applied to the N adjacent detection electrodes cancel each other out, M+N+B=P and |M−N|≤Q; in a second signal driving period, apply the non-inverting drive signals to K adjacent detection electrodes, apply the inverting drive signals to L adjacent detection electrodes, and not apply the drive signals to J detection electrodes, wherein the non-inverting drive signals applied to the K adjacent detection electrodes and the inverting drive signals applied to the L adjacent detection electrodes cancel each other out, K+L+J=P and |K−L|≤Q; in a third signal driving period, apply the non-inverting drive signals to G adjacent detection electrodes, apply the inverting drive signals to H adjacent detection electrodes, and not apply the drive signals to F detection electrodes, wherein the non-inverting drive signals applied to the G adjacent detection electrodes and the inverting drive signals applied to the H adjacent detection electrodes cancel each other out, G+H+F=P and |G−H|≤Q; and in a fourth signal driving period, apply the non-inverting drive signals to T adjacent detection electrodes, apply the inverting drive signals to Y adjacent detection electrodes, and not apply the drive signals to U detection electrodes, wherein the non-inverting drive signals applied to the T adjacent detection electrodes and the inverting drive signals applied to the Y adjacent detection electrodes cancel each other out, T+Y+U=P, |T−Y|≤Q and M+K+H+T≥P; wherein Q denotes a number of detection electrodes after the cancelling which makes an active pen not cause moire, and P denotes a number of detection electrodes not greater than a number of detection electrodes on a touch control screen.

According to the sixth aspect, in a possible implementation, the P detection electrodes are horizontal detection electrodes or longitudinal detection electrodes, and P denotes a number of the horizontal detection electrodes or a number of the longitudinal detection electrodes.

According to the sixth aspect, in a possible implementation, a number of detection electrodes to which the non-inverting drive signals are applied in two of the four signal driving periods is greater than or equal to 3.

According to the sixth aspect, in a possible implementation, the signal driving module is further configured to: in the first signal driving period, not apply the drive signals to I detection electrodes, wherein the I detection electrodes are located between the M adjacent detection electrodes and the N adjacent detection electrodes; in the second signal driving period, not apply the drive signals to O detection electrodes, wherein the O detection electrodes are located between the K adjacent detection electrodes and the L adjacent detection electrodes; in the third signal driving period, not apply the drive signals to Z detection electrodes, wherein the Z detection electrodes are located between the G adjacent detection electrodes and the H adjacent detection electrodes; and in the fourth signal driving period, not apply the drive signals to W detection electrodes, wherein the W detection electrodes are located between the T adjacent detection electrodes and the Y adjacent detection electrodes; wherein I<B, O<J, Z<F and W<U.

According to the sixth aspect, in a possible implementation, I=1, O=1, Z=1 and W=1.

According to the sixth aspect, in a possible implementation, M-N=K-L=G-H=T-Y.

In a seventh aspect, a touch control chip is provided, which includes the signal driving apparatus according to any one of the above aspects.

Based on the above technical solutions, one signal driving cycle includes a plurality of signal driving periods in which drive signals are applied to P detection electrodes. In each signal driving period, non-inverting drive signals are applied to a part of the detection electrodes while inverting drive signals are applied to the other part of the detection electrodes. A number of detection electrodes to which the non-inverting drive signals are applied after the cancelling is smaller than a number of detection electrodes which makes an active pen not cause moire. In the plurality of signal driving periods, the non-inverting drive signals are applied to all the P detection electrodes, thereby solving the Moire phenomenon on a display while keeping the drawing tracks of the active pen on the display unbroken.

BRIEF DESCRIPTION OF THE DRAWINGS

One or more embodiments are described as examples with reference to the corresponding figures in the accompanying drawings, and the examples do not constitute a limitation to the embodiments. The figures in the accompanying drawings do not constitute a proportion limitation unless otherwise stated. The division of the following embodiments is convenient for description, and should not constitute any limitation to specific implementation of the present disclosure. Each of the embodiments may be combined with or refer to each other without contradiction.

DETAILED DESCRIPTION OF THE EMBODIMENTS

In order to make the objectives, the technical solutions and the advantages of the present disclosure clearer, some embodiments of the present disclosure will be further described in the following with reference to the accompanying drawings. It shall be appreciated that the particular embodiments described herein are only meant to explain rather than limit the present disclosure.

Figure 1:
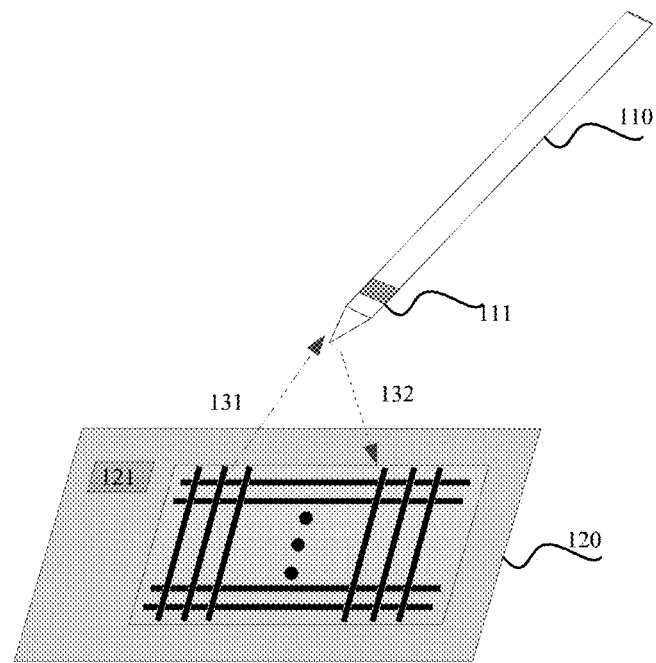
FIG. 1 is a schematic diagram illustrating the principle for use of an active pen on a touch control screen.

With reference to FIG. 1, a certain number of detection electrodes are distributed on a touch control screen 120. The detection electrodes include horizontal detection electrodes and longitudinal detection electrodes. An active pen 110 needs to receive an uplink spreading signal 131 sent from the touch control screen 120 through the horizontal detection electrode and/or the longitudinal detection electrode. After receiving a correct uplink spreading signal, the active pen 110 sends a downlink signal 132 to the touch control screen 120. A Bluetooth chip 111 of the active pen 110 receives information, for example, a frequency of the downlink signal, transmitted by a Bluetooth chip 121 of the touch control screen 120. Herein, the uplink spreading signal 131 sent from the touch control screen 120 is configured to wake up the active pen 110 and cause the touch control screen 120 to establish synchronization with the active pen 110. The downlink signal 132 sent by the active pen 110 is configured to compute two-dimensional location coordinates of the active pen 110 on the touch control screen 120.

Figure 2:
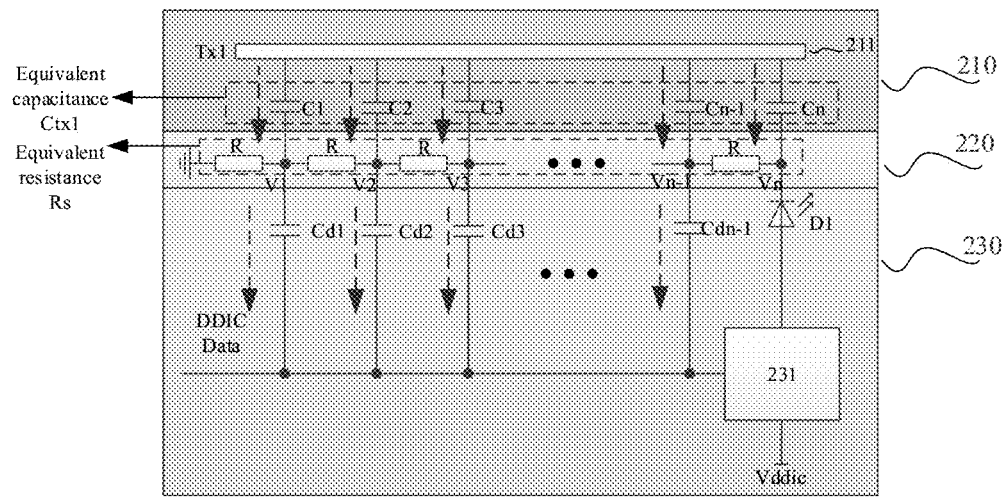
FIG. 2 is a schematic diagram illustrating principle analysis for generation of moire when a single detection electrode is in operation.

With reference to FIG. 2, FIG. 2 is a simplified analysis diagram of a single detection electrode and a display. A plurality of detection electrodes are distributed on a sensor 210 on the touch control screen. In this embodiment, a single horizontal detection electrode TX1 is taken as an example for description. Capacitances C1 to Cn exist between a horizontal detection electrode TX1 211 and a display cathode plate 220, and a resistor R exists between the display cathode plate 220 and ground. When the touch control screen sends an uplink spreading signal to the active pen through the horizontal detection electrode TX1 211, a large amount of energy passes through the capacitances C1-Cn and is coupled to the display cathode plate 220. Due to existence of the resistor R, some uplink spreading signals V1 to Vn may remain on the display cathode plate 220. These remaining uplink spreading signals V1 to Vn affect display data (DDIC Data) output by a display driving circuit 231 through capacitances Cd1 to Cdn, thereby affecting display of a light-emitting diode D1 and finally causing visible moire on the display 230.

In a conventional touch control screen, self-capacitances between horizontal detection electrodes and ground and self-capacitances between longitudinal detection electrodes and ground are both around 100 Pf. In a Y-OCTA touch control screen, however, self-capacitances between horizontal detection electrodes and ground and self-capacitances between longitudinal detection electrodes and ground are both around 500 Pf. Compared with the conventional touch control screen, the uplink spreading signal sent by the Y-OCTA touch control screen is easier to be coupled to the display. The larger the remaining uplink spreading signals are in magnitude, the more evident the moire is.

Figure 3:
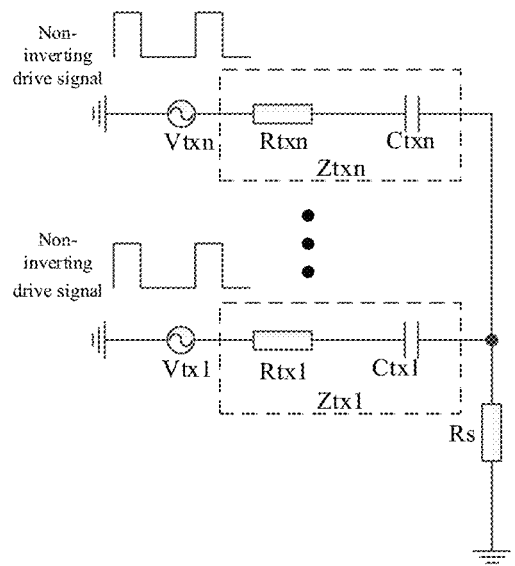
FIG. 3 is a schematic diagram illustrating principle analysis for generation of moire when a plurality of detection electrodes are in operation.

With reference to FIG. 3, FIG. 3 is a simplified analysis diagram of a plurality of detection electrodes and the display. An equivalent resistance Rs between the display cathode plate and ground is much smaller than an equivalent impedance of a detection electrode. ZTX1 to ZTXn are equivalent impedances of single detection electrodes, and RTX1 to RTXn are respective equivalent resistance of respective single detection electrode. In application of the active pen, the touch control screen transmits the uplink spreading signals to the active pen by simultaneously applying non-inverting drive signals to horizontal detection electrodes and/or longitudinal detection electrodes. In order to ensure that the active pen is able to receive the uplink spreading signals sent by the touch control screen within a certain distance between the active pen and the touch control screen, the non-inverting drive signals needs to be applied to the plurality of detection electrodes simultaneously. For example, the non-inverting drive signals are applied to all the horizontal detection electrodes or longitudinal detection electrodes, so that the uplink spreading signal received by the active pen is strong enough. However, the remaining uplink spreading signal Vn satisfies Vn∝n*VTX, where n is a number of detection electrodes to which drive signals are applied, and VTX is a magnitude of the uplink spreading signal. That is, the greater the number of detection electrodes to which the drive signals are simultaneously applied, the larger the remaining uplink spreading signal Vn is in magnitude, and the easier for the moire to appear.

When the active pen draws lines on the touch control screen, the touch control screen needs to display in real time drawing tracks of the active pen. In order to ensure the drawing tracks of the active pen displayed on the touch control screen unbroken and the active pen being able to receive the uplink spreading signal sent by the touch control screen within a certain distance between the active pen and the touch control screen, the detection electrodes on a full screen of the touch control screen need to operate simultaneously, and at this time, the moire is thus easier to appear on the display.

Accordingly, the present disclosure provides a signal driving method, which may enable the active pen to receive the uplink spreading signal sent by the touch control screen within the certain distance between the active pen and the touch control screen while keeping the drawing tracks of the active pen displayed on the touch control screen unbroken, and avoid visible moire or weaken the Moire phenomenon.

Figure 4:
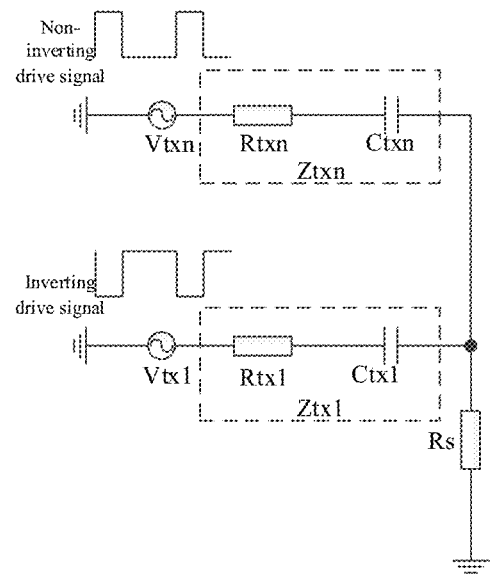
FIG. 4 is a schematic diagram of a signal driving method according to an embodiment of the present disclosure.
Figure 5:
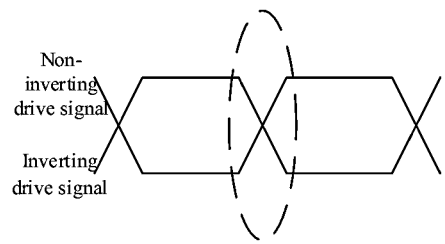
FIG. 5 is a schematic diagram of analysis on a non-inverting drive signal and an inverting drive signal according to an embodiment of the present disclosure.

FIG. 4 is a schematic diagram of a signal driving method according to an embodiment of the present disclosure. The touch control screen sends a correct uplink spreading signal to some detection electrodes, and the correct uplink spreading signal is referred to as a non-inverting drive signal. The touch control screen sends an uplink spreading signal with a phase opposite to that of the non-inverting drive signal to some other detection electrodes, and the uplink spreading signal is referred to as an inverting drive signal. The above uplink spreading signals are collectively referred to as drive signals. Using the inverting drive signal to cancel out the non-inverting drive signal, so as to minimize the magnitude of the remaining uplink spreading signal Vn, thereby resolving the effect of the moire. In this embodiment, two adjacent detection electrodes are taken as an example for description. Herein, one of the two detection electrodes transmits the non-inverting drive signal to the active pen, and another detection electrode transmits the inverting drive signal to the active pen. If equivalent resistances of the two detection electrodes and self-capacitances of the two detection electrodes to ground are respectively equal, and the non-inverting drive signal and the inverting drive signal cancel each other out, there is no remaining uplink spreading signal, thereby avoiding interference caused by the uplink spreading signal to the display and resolving the effect of the moire. As shown in FIG. 5, the more symmetrical the phases of the non-inverting and inverting drive signal, the better the cancelling is.

Figure 6:
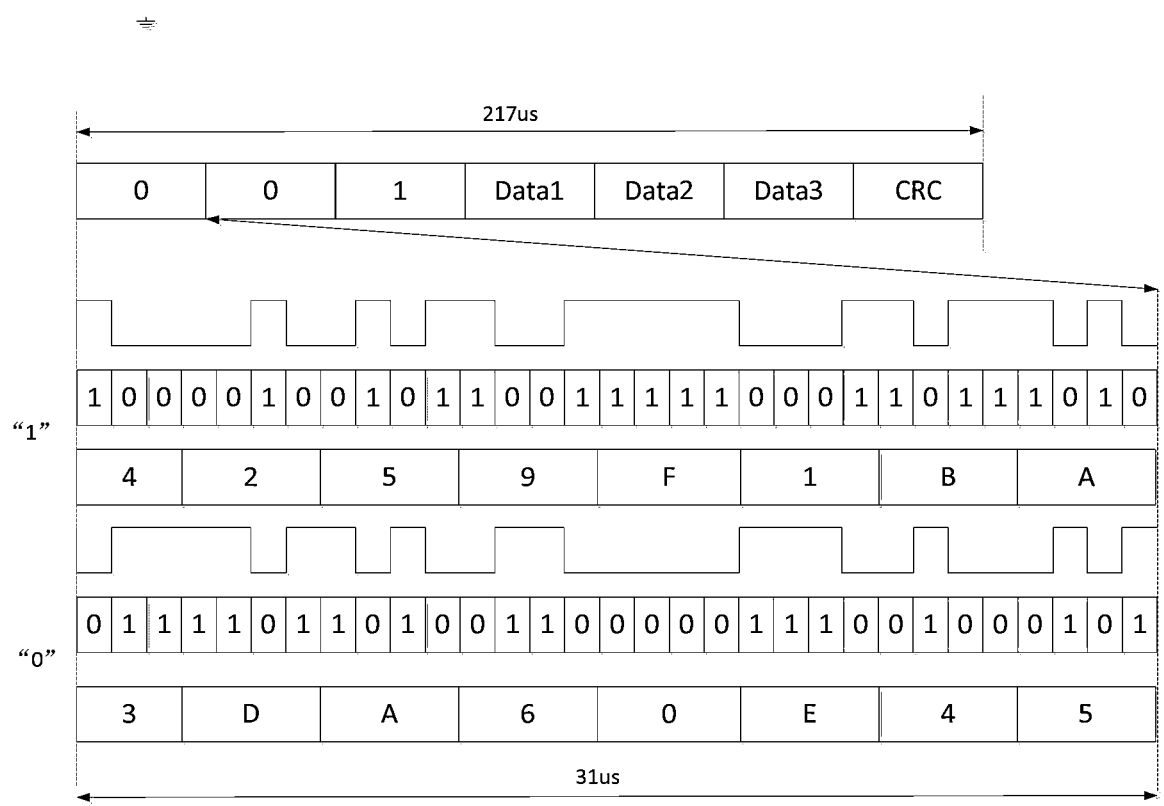
FIG. 6 is a schematic diagram of a timing of a non-inverting drive signal according to an embodiment of the present disclosure.
Figure 7:
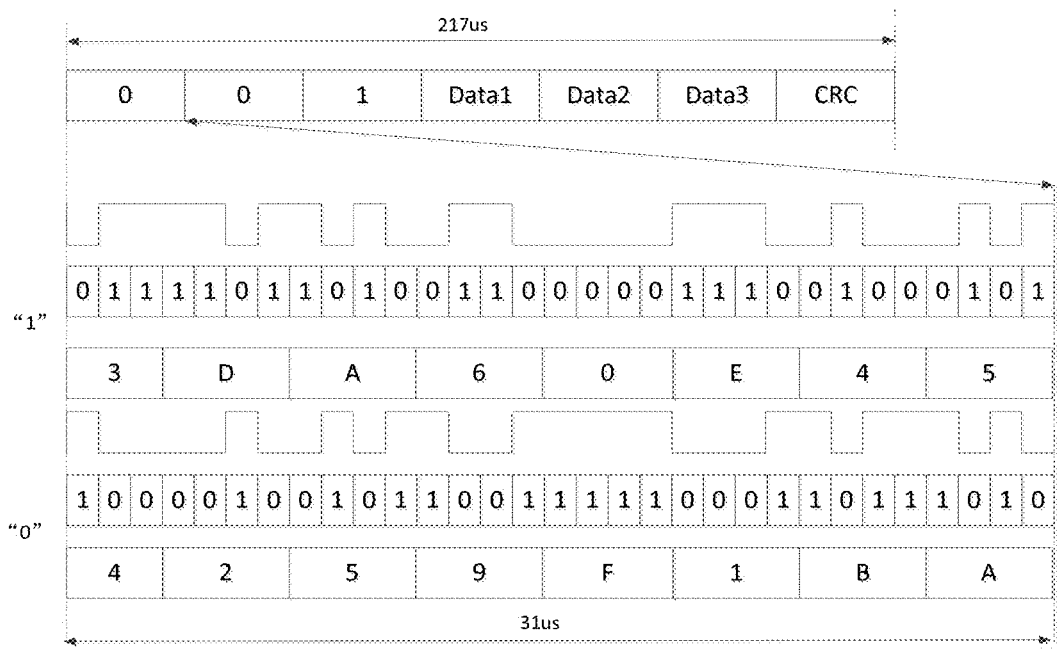
FIG. 7 is a schematic diagram of a timing of an inverting drive signal according to an embodiment of the present disclosure.

The active pen and the touch control screen are two independent systems, which need to communicate and interact with each other based on an active pen protocol, so as to be used in coordination. For a general active pen protocol, for example, a Microsoft pen protocol (MPP), a universal stylus initiative (USI) protocol, a Huawei pen protocol (HPP) and the like, the touch control screen is required to send an uplink spreading signal to wake up and synchronize with the active pen. In this embodiment, an HPP protocol is taken as an example for description. A chip sequence prescribed in the active pen protocol is designated as the non-inverting drive signal, and a signal with a phase 180 degrees opposite to that of the non-inverting drive signal is designated as the inverting drive signal. With reference to FIG. 6 and FIG. 7, an uplink spreading signal shown in FIG. 6 is defined as the non-inverting drive signal, and a phase of an uplink spreading signal shown in FIG. 7 differs 180 degrees from that of the uplink spreading signal shown in FIG. 6, thus the uplink spreading signal shown in FIG. 7 is defined as the inverting drive signal. In the uplink spreading signal shown in FIG. 6, "1" is denoted by a 31-bits code of 0x4259F1BA, "0" is denoted by a 31-bits code of 0x3DA60E45, and a duration of each bit is 1 us. In the uplink spreading signal shown in FIG. 7, "0" is denoted by a 31-bits code of 0x4259F1BA, and "1" is denoted by a 31-bits code of 0x3DA60E45. In this embodiment, coding in the HPP protocol is taken as an example, but it is not limited to this type of spreading and coding in practical application.

In this embodiment, one signal driving cycle includes two signal driving periods in which drive signals are applied to P detection electrodes. The method includes: in a first signal driving period, applying non-inverting drive signals to M adjacent detection electrodes and applying inverting drive signals to N adjacent detection electrodes, where the non-inverting drive signals applied to the M adjacent detection electrodes and the inverting drive signals applied to the N adjacent detection electrodes cancel each other out, M+N≤P and |M−N|≤Q; and in a second signal driving period, applying the non-inverting drive signals to K adjacent detection electrodes and applying the inverting drive signals to L adjacent detection electrodes, where the non-inverting drive signals applied to the K adjacent detection electrodes and the inverting drive signals applied to the L adjacent detection electrodes cancel each other out, K+L≤P,|K−L|≤Q and M+K≥P. Herein, Q denotes a number of detection electrodes after the cancelling which makes an active pen not cause moire, P denotes a number of detection electrodes not greater than a number of detection electrodes on a touch control screen.

Figure 8:
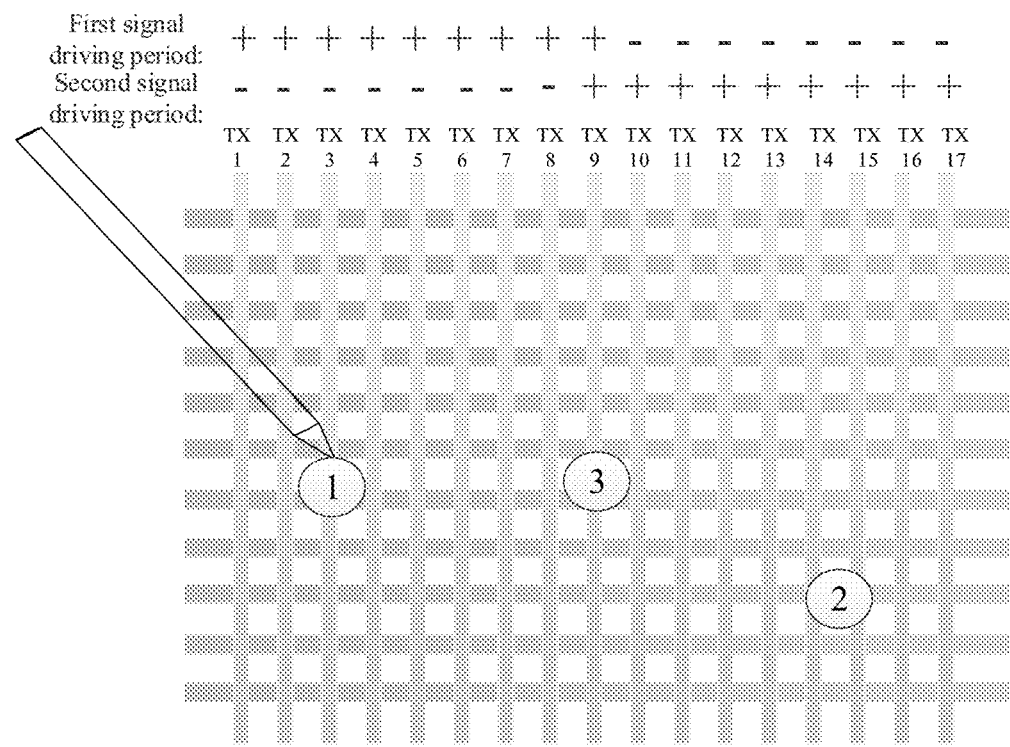
FIG. 8 is a schematic diagram of a possible implementation of a signal driving method according to an embodiment of the present disclosure.

As shown in FIG. 8, in one signal driving cycle, the drive signals are applied to all longitudinal detection electrodes TX1 to TX17 on the touch control screen. In the first signal driving period, the non-inverting drive signals are applied to adjacent detection electrodes TX1 to TX9, and the inverting drive signals are applied to adjacent detection electrodes TX10 to TX17. The non-inverting drive signals applied to the 9 detection electrodes and the inverting drive signals applied to the 8 detection electrodes cancel each other out, and 1 detection electrode to which the non-inverting drive signal is applied is left. Moire caused by the positive pen is relevant to a number of detection electrodes left after the cancelling. The number Q of the detection electrodes which makes the active pen not cause the moire is greater than or equal to the number 1 of the detection electrode left after the cancelling, for example, Q=1. In the second signal driving period, the inverting drive signals are applied to adjacent detection electrodes TX1 to TX8, and the non-inverting drive signals are applied to adjacent detection electrodes TX9 to TX17. The non-inverting drive signals applied to the 9 detection electrodes and the inverting drive signals applied to the 8 detection electrodes cancel each other out, and 1 detection electrode to which the non-inverting drive signal is applied is left. The number Q of the detection electrodes which makes the active pen not cause the moire is greater than or equal to the number 1 of the detection electrode left after the cancelling, for example, Q=1. Herein, P=17, M=9, N=8, K=9 and L=8. A magnitude of the uplink spreading signal is small, which may not cause visible Moire phenomenon.

If the active pen is at position 1, the active pen is able to receive the non-inverting drive signals within a certain height range between the active pen and the touch control screen because the non-inverting drive signals are simultaneously applied to a plurality of detection electrodes at the position 1 in the first signal driving period. If the active pen is at position 2, the active pen is able to receive the non-inverting drive signals within a certain height range between the active pen and the touch control screen because the non-inverting drive signals are simultaneously applied to a plurality of detection electrodes at the position 2 in the second signal driving period. If the active pen is at position 3, strength of the non-inverting drive signal received by the active pen may be reduced because the inverting drive signals are applied to the detection electrodes TX10 and TX8 that are adjacent to the detection electrode TX9 in the first and second signal driving periods, so that the active pen is unable to receive the non-inverting drive signal from the touch control screen within a certain height range. In other words, a height at which the active pen is able to receive the non-inverting drive signal at the position 3 is lower than a height at which the active pen is able to receive the non-inverting drive signal at the position 1 or the position 2. Herein, the non-inverting drive signal is applied to TX9 in both the first signal driving period and the second signal driving period. That is, the number of detection electrodes to which the non-inverting drive signals are applied in the two signal driving periods is 1. Alternatively, in order to ensure the drawing tracks of the active pen unbroken, the non-inverting drive signals may be applied to a plurality of detection electrodes in both the first signal driving period and the second signal driving period. Since the non-inverting drive signals are applied to all the longitudinal detection electrodes on the touch control screen in the first and second signal driving periods together, thus ensuring that the active pen is able to receive the non-inverting drive signals at any position on the touch control screen. In this way, the Moire phenomenon is avoided while ensuring the drawing tracks of the active pen unbroken.

Figure 9:
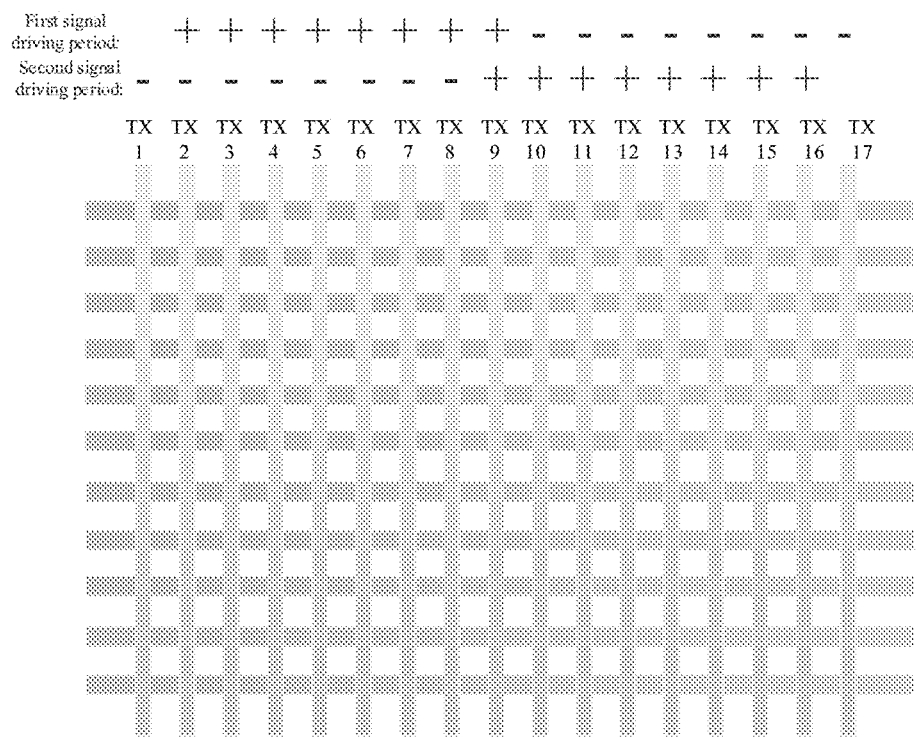
FIG. 9 is a schematic diagram of a possible implementation of a signal driving method according to another embodiment of the present disclosure.

For example, as shown in FIG. 9, in one signal driving cycle, the drive signals are applied to 16 longitudinal detection electrodes on the touch control screen. In the first signal driving period, the non-inverting drive signals are applied to adjacent detection electrodes TX2 to TX9, and the inverting drive signals are applied to adjacent detection electrodes TX10 to TX17. The non-inverting drive signals applied to the 8 detection electrodes and the inverting drive signals applied to the 8 detection electrodes cancel each other out, and O detection electrode to which the drive signal is applied is left. There is no uplink spreading signal remaining on the cathode plate, thus achieving perfect cancelling. In the second signal driving period, the inverting drive signals are applied to adjacent detection electrodes TX1 to TX8, and the non-inverting drive signals are applied to adjacent detection electrodes TX9 to TX16. The non-inverting drive signals applied to the 8 detection electrodes and the inverting drive signals applied to the 8 detection electrodes cancel each other out, and O detection electrode to which the drive signal is applied is left. There is no uplink spreading signal remaining on the cathode plate, thus achieving perfect cancelling. Herein, P=16, M=9, N=8, K=8 and L=8. Since the number of detection electrodes to which the non-inverting drive signals are applied is equal to the number of detection electrodes to which the inverting drive signals are applied in each period of one cycle, the perfect cancelling is achieved, so that visible Moire phenomenon may not appear.

In another embodiment, the non-inverting drive signal is applied to TX9 in both the first signal driving period and the second signal driving period. Alternatively, the non-inverting drive signals may be applied to the plurality of detection electrodes both the first signal driving period and the second signal driving period. That is, the number of detection electrodes to which the non-inverting drive signals are applied in the two signal driving periods is greater than or equal to 1, which is advantageous for keeping the drawing tracks of the active pen unbroken.

In another embodiment, the number of detection electrodes after the cancelling in the first signal driving period may be equal to the number of detection electrodes after the cancelling in the second signal driving period, i.e., M−N=K−L.

Figure 10:
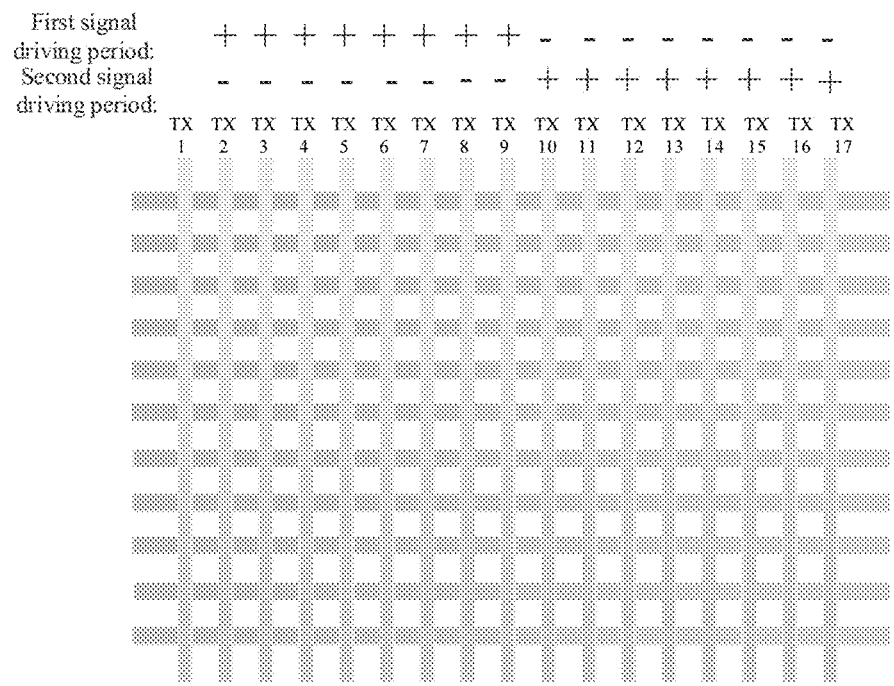
FIG. 10 is a schematic diagram of a possible implementation of a signal driving method according to another embodiment of the present disclosure.

In another embodiment, the drive signals may be only applied to some of the longitudinal detection electrodes. For example, as shown in FIG. 10, the touch control screen only applies the drive signals to detection electrodes TX2 to TX17 and do not apply the drive signals to the longitudinal detection electrode TX1 disposed at the edge. Generally, the active pen rarely touches regions at the edge, so that use of the active pen may not be affected.

In another embodiment, the drive signals may be applied to the horizontal detection electrodes on the full screen.

Alternatively, the drive signals may be only applied to some of the horizontal detection electrodes.

In another embodiment, no drive signal is applied to I detection electrodes in the first signal driving period, and no drive signal is applied to O detection electrodes in the second signal driving period. Herein, the I detection electrodes are located between the M adjacent detection electrodes and the N adjacent detection electrodes, and the O detection electrodes are located between the K adjacent detection electrodes and the L adjacent detection electrodes.

Figure 11:
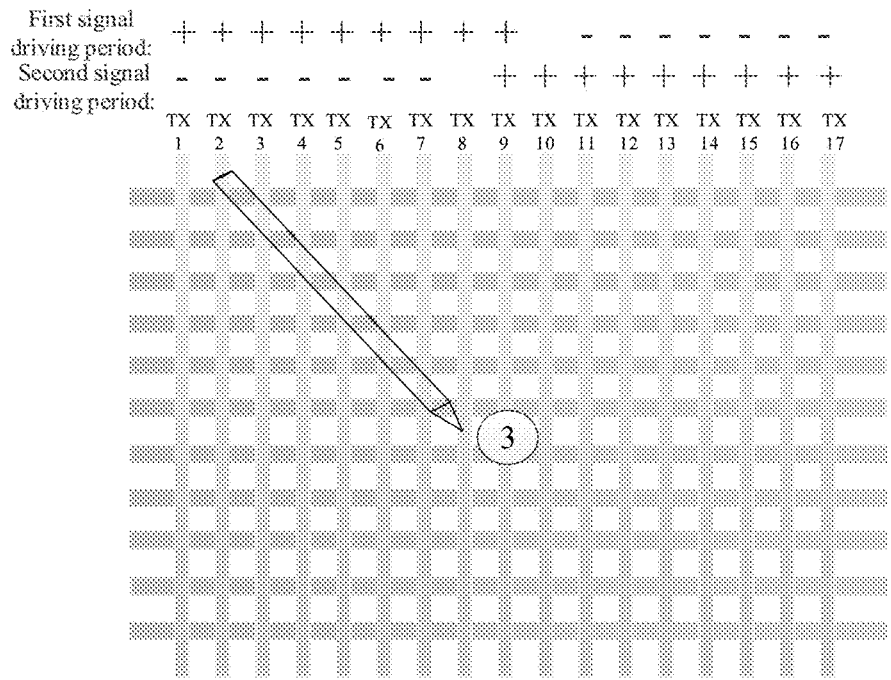
FIG. 11 is a schematic diagram of a possible implementation of a signal driving method according to another embodiment of the present disclosure.

As shown in FIG. 11, in one signal driving cycle, the drive signals are applied to 17 longitudinal detection electrodes on the touch control screen. In the first signal driving period, the non-inverting drive signals are applied to adjacent detection electrodes TX1 to TX9, the inverting drive signals are applied to adjacent detection electrodes TX11 to TX17, and no drive signal is applied to the detection electrode TX10 between the detection electrode TX9 to which the non-inverting drive signal is applied and the detection electrode TX11 to which the inverting drive signal is applied. The non-inverting drive signals applied to the 9 detection electrodes and the inverting drive signals applied to the 7 detection electrodes cancel each other out, and 2 detection electrodes to which the non-inverting drive signals are applied are left. Moire caused by the positive pen is relevant to a number of detection electrodes left after the cancelling. The number Q of the detection electrodes which makes the active pen not cause the moire is greater than or equal to the number 2 of the detection electrode left after the cancelling, for example, Q=2. In the second signal driving period, the inverting drive signals are applied to adjacent detection electrodes TX1 to TX7, the non-inverting drive signals are applied to adjacent detection electrodes TX9 to TX17, and no drive signal is applied to the detection electrode TX8 between the detection electrode TX9 to which the non-inverting drive signal is applied and the detection electrode TX7 to which the inverting drive signal is applied. The non-inverting drive signals applied to the 9 detection electrodes and the inverting drive signals applied to the 7 detection electrodes cancel each other out, and 2 detection electrodes to which the non-inverting drive signals are applied are left. Moire caused by the positive pen is relevant to a number of detection electrodes left after the cancelling. The number Q of the detection electrodes which makes the active pen not cause the moire is greater than or equal to the number 2 of the detection electrode left after the cancelling, for example, Q=2. Herein, P=17, M=9, N=7, K=9, L=7, I=1 and O=1. Not applying the drive signal to the detection electrode between the detection electrode to which the non-inverting drive signal is applied and the detection electrode to which the inverting drive signal is applied results in that the detection electrode to which the inverting drive signal is applied has small effect on the detection electrode to which the non-inverting drive signal is applied when the active pen is at the position 3, which is advantageous for ensuring that the active pen is able to receive the non-inverting drive signals within a certain height range between the active pen and the touch control screen and keeping the drawing tracks of the active pen unbroken.

In another embodiment of the present disclosure, one signal driving cycle includes three signal driving periods in which drive signals are applied to P detection electrodes. The method includes: in a first signal driving period, applying non-inverting drive signals to M adjacent detection electrodes, applying inverting drive signals to N adjacent detection electrodes, and not applying the drive signals to B detection electrodes, where the non-inverting drive signals applied to the M adjacent detection electrodes and the inverting drive signals applied to the N adjacent detection electrodes cancel each other out, M+N+B=P and |M−N|≤Q; in a second signal driving period, applying the non-inverting drive signals to K adjacent detection electrodes, applying the inverting drive signals to L adjacent detection electrodes, and not applying the drive signals to J detection electrodes, where the non-inverting drive signals applied to the K adjacent detection electrodes and the inverting drive signals applied to the L adjacent detection electrodes cancel each other out, K+L+J=P and |K−L|≤Q; and in a third signal driving period, applying the non-inverting drive signals to G adjacent detection electrodes, applying the inverting drive signals to H adjacent detection electrodes, and not applying the drive signals to F detection electrodes, where the non-inverting drive signals applied to the G adjacent detection electrodes and the inverting drive signals applied to the H adjacent detection electrodes cancel each other out, G+H+F=P, |G−H|≤Q and M+K+H≥P; where Q denotes a number of detection electrodes after the cancelling which makes an active pen not cause moire, and P denotes a number of detection electrodes not greater than a number of detection electrodes on a touch control screen.

Figure 12:
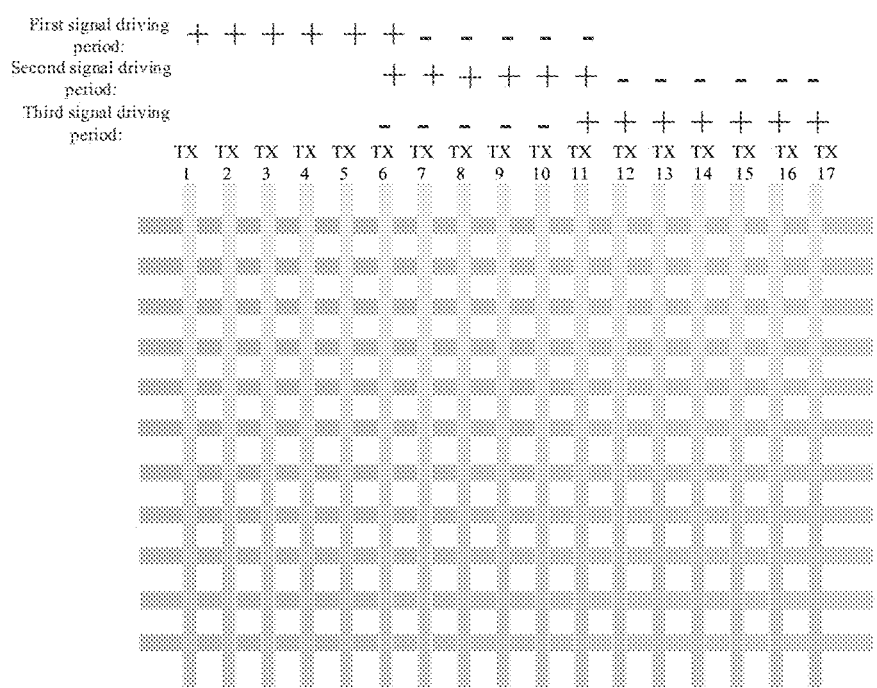
FIG. 12 is a schematic diagram of a possible implementation of a signal driving method according to another embodiment of the present disclosure.

As shown in FIG. 12, the drive signals are applied to longitudinal detection electrodes TX1 to TX17 on the touch control screen. In the first signal driving period, the non-inverting drive signals are applied to adjacent detection electrodes TX1 to TX6, the inverting drive signals are applied to adjacent detection electrodes TX7 to TX17, and no drive signal is applied to detection electrodes TX12 to TX17. The non-inverting drive signals applied to the 6 detection electrodes and the inverting drive signals applied to the 5 detection electrodes cancel each other out, and 1 detection electrode to which the non-inverting drive signal is applied is left. Moire caused by the positive pen is relevant to a number of detection electrodes left after the cancelling. The number Q of the detection electrodes which makes the active pen not cause the moire is greater than or equal to the number 1 of the detection electrode left after the cancelling, for example, Q=2. In the second signal driving period, no drive signal is applied to detection electrodes TX1 to TX5, the non-inverting drive signals are applied to adjacent detection electrodes TX6 to TX11, and the inverting drive signals are applied to adjacent detection electrodes TX12 to TX17. The non-inverting drive signals applied to the 6 detection electrodes and the inverting drive signals applied to the 6 detection electrodes cancel each other out, and O detection electrode to which the drive signal is applied is left. The number Q of the detection electrodes which makes the active pen not cause the moire is greater than or equal to the number 0 of the detection electrode left after the cancelling, for example, Q=2. In the third signal driving period, no drive signal is applied to detection electrodes TX1 to TX5, the inverting drive signals are applied to adjacent detection electrodes TX6 to TX10, and the non-inverting drive signals are applied to adjacent detection electrodes TX11 to TX17. The non-inverting drive signals applied to 7 detection electrodes and the inverting drive signals applied to the 5 detection electrodes cancel each other out, and 2 detection electrodes to which the non-inverting drive signals are applied are left. The number Q of the detection electrodes which makes the active pen not cause the moire is greater than or equal to the number 2 of the detection electrode left after the cancelling, for example, Q=2. Herein, P=17, M=6, N=5, B=6, K=6, L=6, J=5, G=7, H=5 and F=5.

In another embodiment, the non-inverting drive signals are applied to the detection electrodes TX6 and TX11 in two of the three signal driving periods. Alternatively, the non-inverting drive signals may be applied to the plurality of detection electrodes in two of the three signal driving periods. That is, the number of detection electrodes to which the non-inverting drive signals are applied in two of the three signal driving periods is greater than or equal to 2, which is advantageous for keeping the drawing tracks of the active pen unbroken.

In another embodiment, the number of detection electrodes left after the cancelling in the first signal driving period may be equal to the number of detection electrodes left after the cancelling in the second signal driving period, and the number of detection electrodes left after the cancelling in the second signal driving period may be equal to the number of detection electrodes left after the cancelling in the third signal driving period, i.e., M−N=K−L=G−H.

Figure 13:
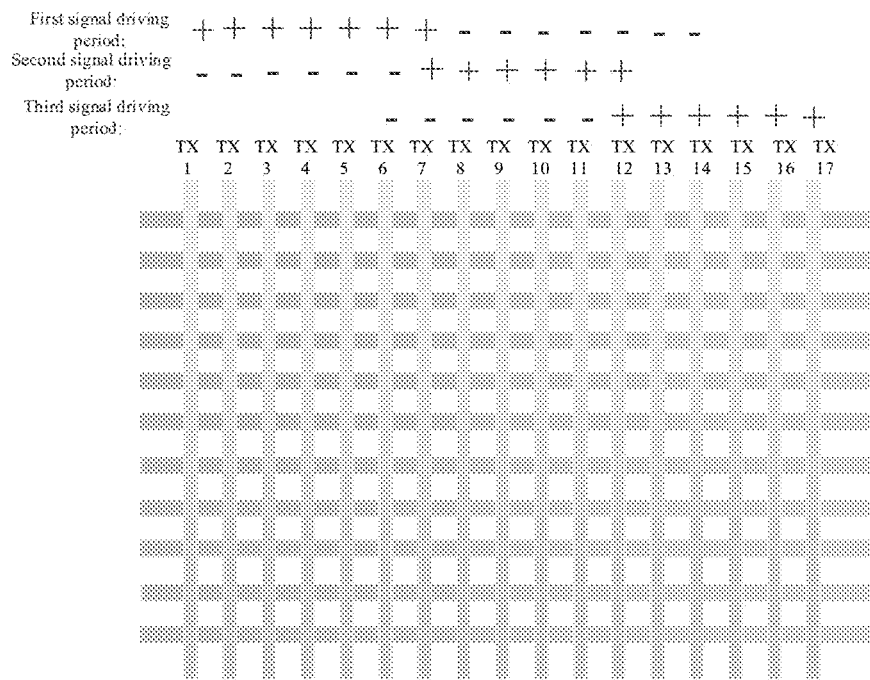
FIG. 13 is a schematic diagram of a possible implementation of a signal driving method according to another embodiment of the present disclosure.

In another embodiment, as shown in FIG. 13, the number of detection electrodes to which the non-inverting drive signals are applied is equal to the number of detection electrodes to which the inverting drive signals are applied in each period, so as to achieving the perfect cancelling, thus the visible Moire phenomenon may not appear.

Figure 14:
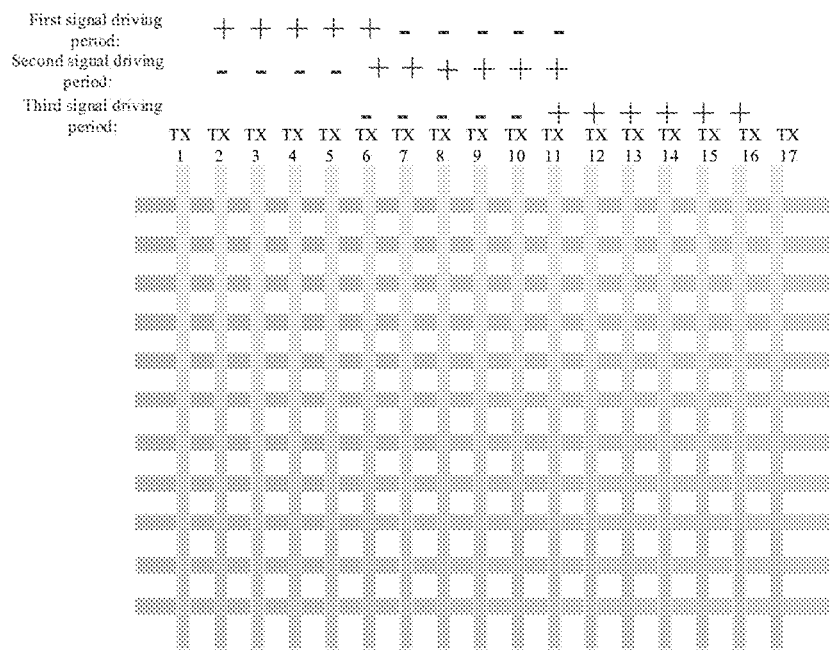
FIG. 14 is a schematic diagram of a possible implementation of a signal driving method according to another embodiment of the present disclosure.

In another embodiment, the drive signals may be only applied to some of longitudinal detection electrodes. As shown in FIG. 14, the touch control screen only applies the drive signals to detection electrodes TX2 to TX16, and do not apply the drive signals to the longitudinal detection electrode TX1 and TX17 disposed at the edge. Generally, the active pen rarely touches regions at the edge, so that use of the active pen may not be affected.

In another embodiment, the drive signals may be applied to the horizontal detection electrodes on the full screen. Alternatively, the drive signals may be only applied to some of the horizontal detection electrodes.

In another embodiment, in the first signal driving period, no drive signal is applied to I detection electrodes, and the I detection electrodes are located between the M adjacent detection electrodes and the N adjacent detection electrodes. In the second signal driving period, no drive signal is applied to O detection electrodes, and the O detection electrodes are located between the K adjacent detection electrodes and the L adjacent detection electrodes. In the third signal driving period, no drive signal is applied to Z detection electrodes, and the P detection electrodes are located between the G adjacent detection electrodes and the H adjacent detection electrodes. Herein, I<B, O<J and Z<F.

Figure 15:
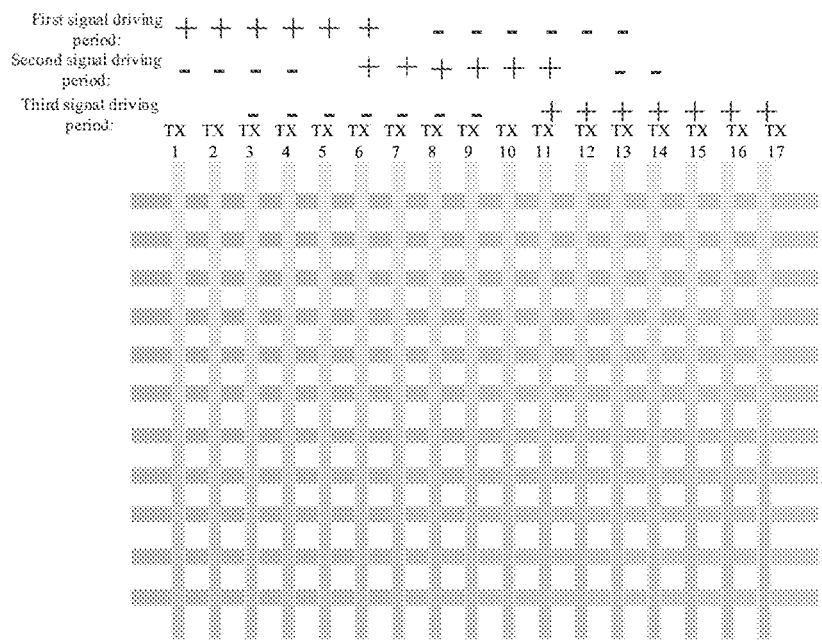
FIG. 15 is a schematic diagram of a possible implementation of a signal driving method according to another embodiment of the present disclosure.

For example, as shown in FIG. 15, in one signal driving cycle, the drive signals are applied to 17 longitudinal detection electrodes on the touch control screen. In the first signal driving period, the non-inverting drive signals are applied to adjacent detection electrodes TX1 to TX6, the inverting drive signals are applied to adjacent detection electrodes TX8 to TX13, and no drive signal is applied to the detection electrodes TX7 and TX14 to TX17. The detection electrode TX7 to which no drive signal is applied is located between the detection electrode TX6 to which the non-inverting drive signal is applied and the detection electrode TX8 to which the inverting drive signal is applied. The non-inverting drive signals applied to the 6 detection electrodes and the inverting drive signals applied to the 6 detection electrodes cancel each other out, and O detection electrode to which the drive signal is applied is left. In the second signal driving period, the inverting drive signals are applied to adjacent detection electrodes TX1 to TX4 and TX13 to TX14, the non-inverting drive signals are applied to adjacent detection electrodes TX6 to TX11, and no drive signal is applied to the detection electrodes TX5, TX12 and TX15 to TX17. The detection electrode TX5 to which no drive signal is applied is located between the detection electrode TX6 to which the non-inverting drive signal is applied and the detection electrode TX4 to which the inverting drive signal is applied. The detection electrode TX12 to which no drive signal is applied is located between the detection electrode TX11 to which the non-inverting drive signal is applied and the detection electrode TX13 to which the inverting drive signal is applied. The non-inverting drive signals applied to the 6 detection electrodes and the inverting drive signals applied to the 6 detection electrodes cancel each other out, and O detection electrode to which the drive signal is applied is left. In the third signal driving period, adjacent detection electrodes TX3 to TX9 to which the inverting drive signal is applied, the non-inverting drive signals are applied to adjacent detection electrodes TX11 to TX17, and no drive signal is applied to the detection electrodes TX1 to TX2 and TX10. The detection electrode TX10 to which no drive signal is applied is located between the detection electrode TX11 to which the non-inverting drive signal is applied and the detection electrode TX9 to which the inverting drive signal is applied. The non-inverting drive signals applied to the 6 detection electrodes and the inverting drive signals applied to the 6 detection electrodes cancel each other out, and O detection electrode to which the drive signal is applied is left. Herein, P=17, M=6, N=6, B=5, K=6, L=6, J=5, G=7, H=7, F=3, I=1, O=1 and P=1. Not applying the drive signal to the detection electrode between the detection electrode to which the non-inverting drive signal is applied and the detection electrode to which the inverting drive signal is applied results in that the detection electrode to which the inverting drive signal is applied has small effect on the detection electrode to which the non-inverting drive signal is applied when the active pen is at a position between the detection electrode to which the non-inverting drive signal is applied and the detection electrode to which the inverting drive signal is applied, which is advantageous for ensuring that the active pen is able to receive the non-inverting drive signals within a certain height range between the active pen and the touch control screen and keeping the drawing tracks of the active pen unbroken.

In another embodiment of the present disclosure, one signal driving cycle includes four signal driving periods in which drive signals are applied to P detection electrodes. The method includes: in a first signal driving period, applying non-inverting drive signals to M adjacent detection electrodes, applying inverting drive signals to N adjacent detection electrodes, and not applying the drive signals to B detection electrodes, where the non-inverting drive signals applied to the M adjacent detection electrodes and the inverting drive signals applied to the N adjacent detection electrodes cancel each other out, M+N+B=P and |M−N|≤Q; in a second signal driving period, applying the non-inverting drive signals to K adjacent detection electrodes, applying the inverting drive signals to L adjacent detection electrodes, and not applying the drive signals to J detection electrodes, where the non-inverting drive signals applied to the K adjacent detection electrodes and the inverting drive signals applied to the L adjacent detection electrodes cancel each other out, K+L+J=P and |K−L|≤Q; in a third signal driving period, applying the non-inverting drive signals to G adjacent detection electrodes, applying the inverting drive signals to H adjacent detection electrodes, and not applying the drive signals to F detection electrodes, where the non-inverting drive signals applied to the G adjacent detection electrodes and the inverting drive signals applied to the H adjacent detection electrodes cancel each other out, G+H+

F=P and |G−H|≤Q; and in a fourth signal driving period, applying the non-inverting drive signals to T adjacent detection electrodes, applying the inverting drive signals to Y adjacent detection electrodes, and not applying the drive signals to U detection electrodes, where the non-inverting drive signals applied to the T adjacent detection electrodes and the inverting drive signals applied to the Y adjacent detection electrodes cancel each other out, T+Y+U=P, |T−Y|≤Q and M+K+H+T≥P; where Q denotes a number of detection electrodes after the cancelling which makes an active pen not cause moire, and P denotes a number of detection electrodes not greater than a number of detection electrodes on a touch control screen.

Figure 16:
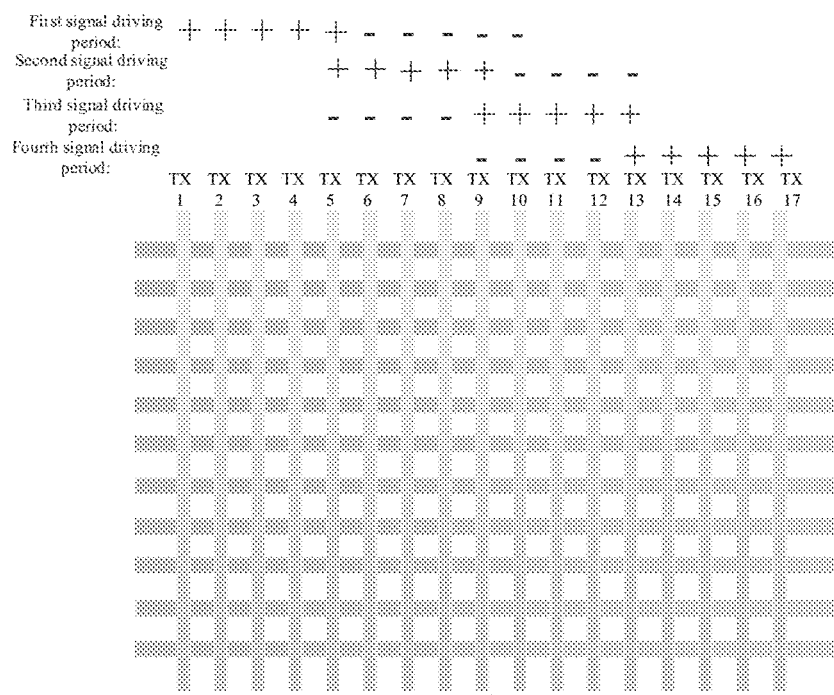
FIG. 16 is a schematic diagram of a possible implementation of a signal driving method according to another embodiment of the present disclosure.

For example, as shown in FIG. 16, the drive signals are applied to longitudinal detection electrodes TX1 to TX17 on the touch control screen. In the first signal driving period, the non-inverting drive signals are applied to adjacent detection electrodes TX1 to TX5, the inverting drive signals are applied to adjacent detection electrodes TX6 to TX10, and no drive signal is applied to the detection electrodes TX11 to TX17. The non-inverting drive signals applied to the 5 detection electrodes and the inverting drive signals applied to the 5 detection electrodes cancel each other out, and O detection electrode to which the drive signal is applied is left. Moire caused by the positive pen is relevant to a number of detection electrodes left after the cancelling. The number Q of the detection electrodes which makes the active pen not cause the moire is greater than or equal to the number 0 of the detection electrode left after the cancelling, for example, Q=2. In the second signal driving period, no drive signal is applied to the detection electrodes TX1 to TX4 and TX14 to TX17, the non-inverting drive signals are applied to adjacent detection electrodes TX5 to TX9, and the inverting drive signals are applied to adjacent detection electrodes TX10 to TX13. The non-inverting drive signals applied to the 5 detection electrodes and the inverting drive signals applied to the 4 detection electrodes cancel each other out, and 1 detection electrode to which the non-inverting drive signal is applied is left. The number Q of the detection electrodes which makes the active pen not cause the moire is greater than or equal to the number 1 of the detection electrode left after the cancelling, for example, Q=2. In the third signal driving period, no drive signal is applied to the detection electrodes TX1 to TX4 and TX14 to TX17, the inverting drive signals are applied to adjacent detection electrodes TX5 to TX8, and the non-inverting drive signals are applied to adjacent detection electrodes TX9 to TX13. The non-inverting drive signals applied to the 5 detection electrodes and the inverting drive signals applied to the 4 detection electrodes cancel each other out, and 1 detection electrode to which the non-inverting drive signal is applied is left. The number Q of the detection electrodes which makes the active pen not cause the moire is greater than or equal to the number 1 of the detection electrode left after the cancelling, for example, Q=2. In the fourth signal driving period, no drive signal is applied to the detection electrodes TX1 to TX8, the inverting drive signals are applied to adjacent detection electrodes TX9 to TX12, and the non-inverting drive signals are applied to adjacent detection electrodes TX13 to TX17. The non-inverting drive signals applied to the 5 detection electrodes and the inverting drive signals applied to the 4 detection electrodes cancel each other out, and 1 detection electrode to which the non-inverting drive signal is applied is left. The number Q of the detection electrodes which makes the active pen not cause the moire is greater than or equal to the number 1 of the detection electrode left after the cancelling, for example, Q=2. Herein, P=17, M=5, N=5, B=7, K=5, L=4, J=8, G=5, H=4, F=9, T=5, Y=4 and U=8.

In another embodiment, the non-inverting drive signals are applied to the detection electrodes TX5, TX9 and TX13 in two of the four signal driving periods. Alternatively, the non-inverting drive signals may be applied to the plurality of detection electrodes in two of the four signal driving periods. That is, the number of detection electrodes to which the non-inverting drive signals are applied in two of the four signal driving periods is greater than or equal to 3, which is advantageous for keeping the drawing tracks of the active pen unbroken.

In another embodiment, the number of detection electrodes left after the cancelling in the first signal driving period may be equal to the number of detection electrodes left after the cancelling in the second signal driving period, the number of detection electrodes left after the cancelling in the second signal driving period may be equal to the number of detection electrodes left after the cancelling in the third signal driving period, and the number of detection electrodes left after the cancelling in the third signal driving period may be equal to the number of detection electrodes left after the cancelling in the fourth signal driving period, i.e., M−N=K−L=G−H=T−Y.

Figure 17:
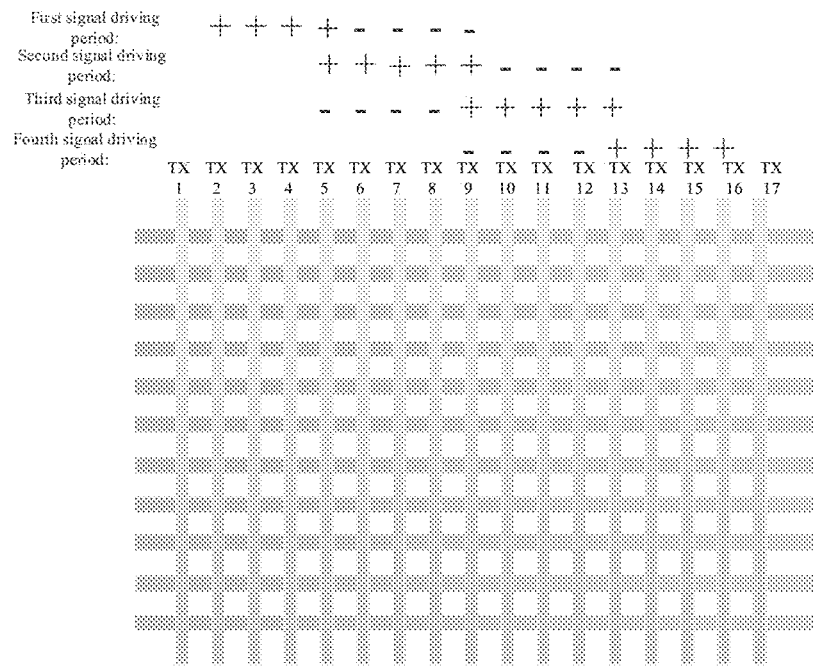
FIG. 17 is a schematic diagram of a possible implementation of a signal driving method according to another embodiment of the present disclosure.

In another embodiment, the drive signals may be only applied to some of the longitudinal detection electrodes. As shown in FIG. 17, the touch control screen only applies the drive signals to detection electrodes TX2 to TX16, and do not apply the drive signals to the longitudinal detection electrodes TX1 and TX17 disposed at the edge. Generally, the active pen rarely touches regions at the edge, so that use of the active pen may not be affected.

In another embodiment, the drive signals may be applied to the horizontal detection electrodes on the full screen. Alternatively, the drive signals may be only applied to some of the horizontal detection electrodes.

In another embodiment, in the first signal driving period, no drive signal is applied to I detection electrodes, and the I detection electrodes are located between the M adjacent detection electrodes and the N adjacent detection electrodes. In the second signal driving period, no drive signal is applied to O detection electrodes, and the O detection electrodes are located between the K adjacent detection electrodes and the L adjacent detection electrodes. In the third signal driving period, no drive signal is applied to Z detection electrodes, and the Z detection electrodes are located between the G adjacent detection electrodes and the H adjacent detection electrodes. In the fourth signal driving period, no drive signal is applied to W detection electrodes, and the W detection electrodes are located between the T adjacent detection electrodes and the Y adjacent detection electrodes. Herein, I<B, O<J, Z<F and W<U.

Figure 18:
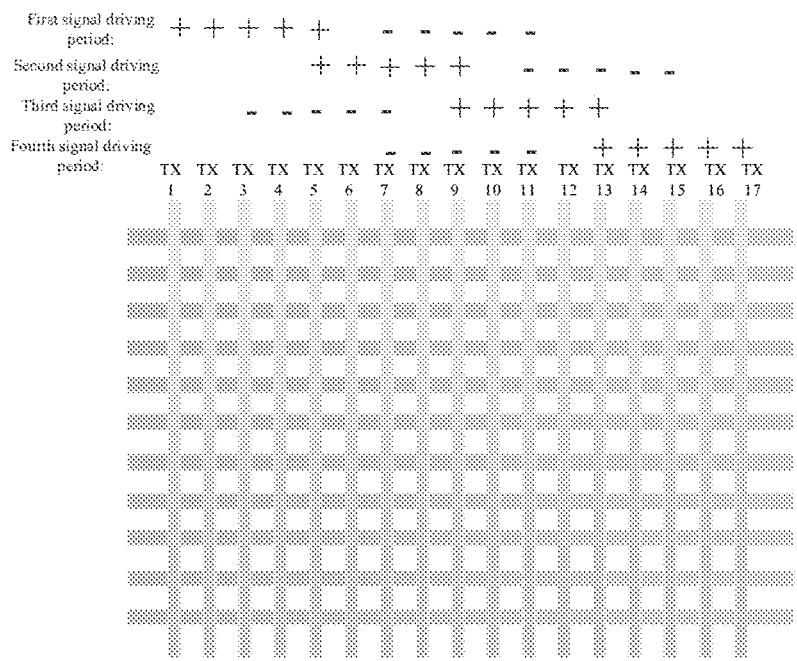
FIG. 18 is a schematic diagram of a possible implementation of a signal driving method according to still another embodiment of the present disclosure.

For example, as shown in FIG. 18, in one signal driving cycle, the drive signals are applied to 17 horizontal detection electrodes on the touch control screen. In the first signal driving period, the non-inverting drive signals are applied to adjacent detection electrodes TX1 to TX5, the inverting drive signals are applied to adjacent detection electrodes TX7 to TX11, and no drive signal is applied to the detection electrodes TX6 and TX12 to TX17. The detection electrode TX6 to which no drive signal is applied is located between the detection electrode TX5 to which the non-inverting drive signal is applied and the detection electrode TX7 to which the inverting drive signal is applied. The non-inverting drive signals applied to the 5 detection electrodes and the inverting drive signals applied to the 5 detection electrodes cancel each other out, and O detection electrode to which the drive signal is applied is left. In the second signal driving period, no drive signal is applied to the detection electrodes TX1 to TX4, TX10 and TX15, the non-inverting drive signals are applied to adjacent detection electrodes TX5 to TX9, and the inverting drive signals are applied to adjacent detection electrodes TX15 to TX17. The detection electrode TX10 to which no drive signal is applied is located between the detection electrode TX9 to which the non-inverting drive signal is applied and the detection electrode TX11 to which the inverting drive signal is applied. The non-inverting drive signals applied to the 5 detection electrodes and the inverting drive signals applied to the 5 detection electrodes cancel each other out, and O detection electrode to which the drive signal is applied is left. In the third signal driving period, the inverting drive signals are applied to adjacent detection electrodes TX3 to TX7, the non-inverting drive signals are applied to adjacent detection electrodes TX9 to TX13, and no drive signal is applied to the detection electrodes TX1 to TX2, TX8 and TX14 to TX17. The detection electrode TX8 to which no drive signal is applied is located between the detection electrode TX9 to which the non-inverting drive signal is applied and the detection electrode TX7 to which the inverting drive signal is applied. The non-inverting drive signals applied to 5 detection electrodes and the inverting drive signals applied to the 5 detection electrodes cancel each other out, and O detection electrode to which the drive signal is applied is left. In the fourth signal driving period, the inverting drive signals are applied to adjacent detection electrodes TX7 to TX11, the non-inverting drive signals are applied to adjacent detection electrodes TX13 to TX17, and no drive signal is applied to the detection electrodes TX1 to TX6 and TX12. The detection electrode TX12 to which no drive signal is applied is located between the detection electrode TX13 to which the non-inverting drive signal is applied and the detection electrode TX11 to which the inverting drive signal is applied. The non-inverting drive signals applied to the 5 detection electrodes and the inverting drive signals applied to the 5 detection electrodes cancel each other out, and O detection electrode to which the drive signal is applied is left. Herein, P=17, M=5, N=5, B=7, K=5, L=5, J=7, G=5, H=5, F=7, T=5, Y=5, U=7, I=1, O=1, Z=1 and W=1. Not applying the drive signal to the detection electrode between the detection electrode to which the non-inverting drive signal is applied and the detection electrode to which the inverting drive signal is applied results in that the detection electrode to which the inverting drive signal is applied has small effect on the detection electrode to which the non-inverting drive signal is applied when the active pen is at a position between the detection electrode to which the non-inverting drive signal is applied and the detection electrode to which the inverting drive signal is applied, which is advantageous for ensuring that the active pen is able to receive the non-inverting drive signals within a certain height range between the active pen and the touch control screen and keeping the drawing tracks of the active pen unbroken.

Figure 19:
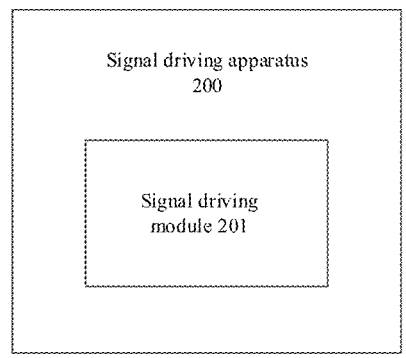
FIG. 19 is a schematic block diagram of a signal driving apparatus according to an embodiment of the present disclosure.

The present disclosure further provides a signal driving apparatus, which may implement any possible signal driving method shown in FIGS. 8 to 11. As shown in FIG. 19, one signal driving cycle includes two signal driving periods in which the apparatus applies drive signals to P detection electrodes. A signal driving apparatus 200 includes: a signal driving module, configured to: in a first signal driving period, apply non-inverting drive signals to M adjacent detection electrodes and apply inverting drive signals to N adjacent detection electrodes, where the non-inverting drive signals applied to the M adjacent detection electrodes and the inverting drive signals applied to the N adjacent detection electrodes cancel each other out, M+N<P and |M−N|≤Q; and in a second signal driving period, apply the non-inverting drive signals to K adjacent detection electrodes and apply the inverting drive signals to L adjacent detection electrodes, where the non-inverting drive signals applied to the K adjacent detection electrodes and the inverting drive signals applied to the L adjacent detection electrodes cancel each other out, K+L<P,|K−L|≤Q and M+K≥P; where Q denotes a number of detection electrodes after the cancelling which makes an active pen not cause moire, and P denotes a number of detection electrodes not greater than a number of detection electrodes on a touch control screen.

In one implementation, the detection electrodes are horizontal detection electrodes or longitudinal detection electrodes, and P denotes a number of the horizontal detection electrodes or a number of the longitudinal detection electrodes.

In one implementation, a number of detection electrodes to which the non-inverting drive signals are applied in the two signal driving periods is greater than or equal to 1.

In one implementation, the coding module is further configured to: in the first signal driving period, not apply the drive signals to I detection electrodes; in the second signal driving period, not apply the drive signals to O detection electrodes; where the I detection electrodes are located between the M adjacent detection electrodes and the N adjacent detection electrodes, and the O detection electrodes are located between the K adjacent detection electrodes and the L adjacent detection electrodes.

In one implementation, I=1 and O=1.

In one implementation, Q=2 or Q=1.

In one implementation, M−N=K−L.

The present disclosure further provides a signal driving apparatus, which may implement any possible signal driving method shown in FIGS. 12 to 15. One signal driving cycle includes three signal driving periods in which the apparatus applies drive signals to P detection electrodes. A signal driving apparatus 200 includes: a signal driving module, configured to: in a first signal driving period, apply non-inverting drive signals to M adjacent detection electrodes, apply inverting drive signals to N adjacent detection electrodes, and not apply the drive signals to B detection electrodes, wherein the non-inverting drive signals applied to the M adjacent detection electrodes and the inverting drive signals applied to the N adjacent detection electrodes cancel each other out, M+N+B=P and |M−N|≤Q; in a second signal driving period, apply the non-inverting drive signals to K adjacent detection electrodes, apply the inverting drive signals to L adjacent detection electrodes, and not apply the drive signals to J detection electrodes, wherein the non-inverting drive signals applied to the K adjacent detection electrodes and the inverting drive signals applied to the L adjacent detection electrodes cancel each other out, K+L+J=P and |K−L|≤Q; and in a third signal driving period, apply the non-inverting drive signals to G adjacent detection electrodes, apply the inverting drive signals to H adjacent detection electrodes, and not apply the drive signals to F detection electrodes, wherein the non-inverting drive signals applied to the G adjacent detection electrodes and the inverting drive signals applied to the H adjacent detection electrodes cancel each other out, G+H+F=P, |G−H|≤Q and M+K+H≥P; wherein Q denotes a number of detection electrodes after the cancelling which makes an active pen not cause moire, and P denotes a number of detection electrodes not greater than a number of detection electrodes on a touch control screen.

In one implementation, the detection electrodes are horizontal detection electrodes or longitudinal detection electrodes, and P denotes a number of the horizontal detection electrodes or a number of the longitudinal detection electrodes.

In one implementation, a number of detection electrodes to which the non-inverting drive signals are applied in two of the three signal driving periods is greater than or equal to 2.

In one implementation, the signal driving module is further configured to: in the first signal driving period, not apply the drive signals to I detection electrodes, wherein the I detection electrodes are located between the M adjacent detection electrodes and the N adjacent detection electrodes; in the second signal driving period, not apply the drive signals to O detection electrodes, wherein the O detection electrodes are located between the K adjacent detection electrodes and the L adjacent detection electrodes; and in the third signal driving period, not apply the drive signals to Z detection electrodes, wherein the Z detection electrodes are located between the G adjacent detection electrodes and the H adjacent detection electrodes; wherein I<B, O<J and Z<F.

In one implementation, I=1, O=1 and Z=1.

In one implementation, Q=2 or Q=1.

In one implementation, M−N=K−L=G−H.

The present disclosure further provides a signal driving apparatus, which may implement any possible signal driving method shown in FIGS. 13 to 18. One signal driving cycle includes four signal driving periods in which the apparatus applies drive signals to P detection electrodes. A signal driving apparatus 200 includes: a signal driving module, configured to: in a first signal driving period, apply non-inverting drive signals to M adjacent detection electrodes, apply inverting drive signals to N adjacent detection electrodes, and not apply the drive signals to B detection electrodes, wherein the non-inverting drive signals applied to the M adjacent detection electrodes and the inverting drive signals applied to the N adjacent detection electrodes cancel each other out, M+N+B=P and |M−N|≤Q; in a second signal driving period, apply the non-inverting drive signals to K adjacent detection electrodes, apply the inverting drive signals to L adjacent detection electrodes, and not apply the drive signals to J detection electrodes, wherein the non-inverting drive signals applied to the K adjacent detection electrodes and the inverting drive signals applied to the L adjacent detection electrodes cancel each other out, K+L+J=P and |K−L|≤Q; in a third signal driving period, apply the non-inverting drive signals to G adjacent detection electrodes, apply the inverting drive signals to H adjacent detection electrodes, and not apply the drive signals to F detection electrodes, wherein the non-inverting drive signals applied to the G adjacent detection electrodes and the inverting drive signals applied to the H adjacent detection electrodes cancel each other out, G+H+F=P and |G−H|≤Q; and in a fourth signal driving period, apply the non-inverting drive signals to T adjacent detection electrodes, apply the inverting drive signals to Y adjacent detection electrodes, and not apply the drive signals to U detection electrodes, wherein the non-inverting drive signals applied to the T adjacent detection electrodes and the inverting drive signals applied to the Y adjacent detection electrodes cancel each other out, T+Y+U=P, |T−Y|≤Q and M+K+H+T≥P; wherein Q denotes a number of detection electrodes after the cancelling which makes an active pen not cause moire, and P denotes a number of detection electrodes not greater than a number of detection electrodes on a touch control screen.

In one implementation, the detection electrodes are horizontal detection electrodes or longitudinal detection electrodes, and P denotes a number of the horizontal detection electrodes or a number of the longitudinal detection electrodes.

In one implementation, a number of detection electrodes to which the non-inverting drive signals are applied in two of the four signal driving periods is greater than or equal to 3.

In one implementation, the signal driving module is further configured to: in the first signal driving period, not apply the drive signals to I detection electrodes, wherein the I detection electrodes are located between the M adjacent detection electrodes and the N adjacent detection electrodes; in the second signal driving period, not apply the drive signals to O detection electrodes, wherein the O detection electrodes are located between the K adjacent detection electrodes and the L adjacent detection electrodes; in the third signal driving period, not apply the drive signals to Z detection electrodes, wherein the Z detection electrodes are located between the G adjacent detection electrodes and the H adjacent detection electrodes; and in the fourth signal driving period, not apply the drive signals to W detection electrodes, wherein the W detection electrodes are located between the T adjacent detection electrodes and the Y adjacent detection electrodes; wherein I<B, O<J, Z<F and W<U.

In one implementation, I=1, O=1, Z=1 and W=1.

In one implementation, M−N=K−L=G−H=T−Y.

Figure 20:
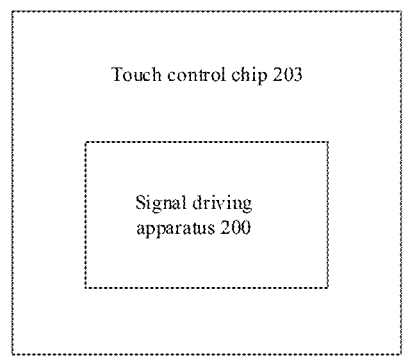
FIG. 20 is a schematic block diagram of a touch control chip according to an embodiment of the present disclosure.

The present disclosure further provides a touch control chip. As shown in FIG. 20, a touch control chip 203 may include the signal driving apparatus 200 shown in FIG. 19.

It should be noted that each of the embodiments and/or the technical features in each of the embodiments described in the present disclosure may be combined with each other arbitrarily without any confliction. A technical solution obtained through combination shall also fall within the protection scope of the present disclosure.

It shall be appreciated that the specific examples in the embodiments of the present disclosure are only to help those skilled in the art to better understand the embodiments of the present disclosure, rather than to limit the scope of the embodiments of the present disclosure. Those skilled in the art may perform any improvements and modifications on the basis of the embodiments described above, and these improvements or modifications fall within the protection scope of the present disclosure.

The above description are only specific implementations of the present disclosure, but the protection scope of the present disclosure is not limited thereto. Any changes or substitutions that those skilled in the art can easily think of within the technical scope disclosed in the present disclosure should fall within the protection scope of the present disclosure. Therefore, the protection scope of the present disclosure shall be subject to the protection scope of the claims.

What is claimed is:

1. A signal driving method, comprising:
in a first signal driving period, applying non-inverting drive signals to M adjacent detection electrodes and applying inverting drive signals to N adjacent detection electrodes different from the M adjacent detection electrodes, wherein M+N<P and the M adjacent detection electrodes and the N adjacent detection electrodes are all part of P detection electrodes, wherein M and N are natural numbers and P is a number of detection electrodes not greater than a number of detection electrodes on a touch control screen; and in a second signal driving period, applying non-inverting drive signals to K adjacent detection electrodes and applying inverting drive signals to L adjacent detection electrodes different from the K adjacent detection electrodes, wherein K+L≤P and the K adjacent detection electrodes and the L adjacent detection electrodes are all part of the P detection electrodes, wherein K and L are natural numbers; wherein:

one signal driving cycle comprises at least two signal driving periods in which drive signals are applied to P detection electrodes, the at least two signal driving periods including the first signal driving period and the second signal driving period;

each of the P detection electrodes is applied a non-inverting drive signal at least once in one signal driving cycle; and phases of the inverting drive signals are opposite to phases of the non-inverting drive signals by 180 degrees.

2. The signal driving method according to claim 1, wherein the detection electrodes are horizontal detection electrodes or longitudinal detection electrodes, and P denotes a number of the horizontal detection electrodes or a number of the longitudinal detection electrodes.

3. The signal driving method according to claim 1, wherein |M−N|≤Q, |K−L|≤Q, wherein Q denotes a number of detection electrodes with which no moire is caused after cancellation between the non-inverting drive signals and the inverting drive signals.

4. The signal driving method according to claim 1, wherein M−N=K−L.

5. The signal driving method according to claim 1, wherein:

in the first signal driving period, the non-inverting drive signals applied to the M adjacent detection electrodes and the inverting drive signals applied to the N adjacent detection electrodes cancel each other out; and in the second signal driving period, the non-inverting drive signals applied to the K adjacent detection electrodes and the inverting drive signals applied to the L adjacent detection electrodes cancel each other out.

6. The signal driving method according to claim 1, wherein non-inverting drive signals are applied to at least one of the P detection electrodes in two signal driving periods.

7. A signal driving method, comprising:

in a first signal driving period, applying non-inverting drive signals to M adjacent detection electrodes and applying inverting drive signals to N adjacent detection electrodes different from the M adjacent detection electrodes, wherein M+N≤P and the M adjacent detection electrodes and the N adjacent detection electrodes are all part of P detection electrodes, wherein M and N are natural numbers and P is a number of detection electrodes not greater than a number of detection electrodes on a touch control screen; and in a second signal driving period, applying non-inverting drive signals to K adjacent detection electrodes and applying inverting drive signals to L adjacent detection electrodes different from the K adjacent detection electrodes, wherein K+L≤P and the K adjacent detection electrodes and the L adjacent detection electrodes are all part of the P detection electrodes, wherein K and L are natural numbers; wherein:

the signal driving method serves for the touch screen to send an uplink spreading signal to an active pen through the P detection electrodes and receive a downlink signal sent by the active pen through the P detection electrodes;

one signal driving cycle comprises at least two signal driving periods in which drive signals are applied to P detection electrodes, the at least two signal driving periods including the first signal driving period and the second signal driving period; and phases of the inverting drive signals are opposite to phases of the non-inverting drive signals by 180 degrees.

8. The signal driving method according to claim 7, wherein the detection electrodes are horizontal detection electrodes or longitudinal detection electrodes, and P denotes a number of the horizontal detection electrodes or a number of the longitudinal detection electrodes.

9. The signal driving method according to claim 7, wherein |M−N|≤Q, |K−L|≤Q, wherein Q denotes a number of detection electrodes with which no moire is caused after cancellation between the non-inverting drive signals and the inverting drive signals.

10. The signal driving method according to claim 7, wherein M−N=K−L.

11. The signal driving method according to claim 7, wherein:

in the first signal driving period, the non-inverting drive signals applied to the M adjacent detection electrodes and the inverting drive signals applied to the N adjacent detection electrodes cancel each other out; and in the second signal driving period, the non-inverting drive signals applied to the K adjacent detection electrodes and the inverting drive signals applied to the L adjacent detection electrodes cancel each other out.

12. The signal driving method according to claim 7, wherein each of the P detection electrodes is applied a non-inverting drive signal at least once in one signal driving cycle, and non-inverting drive signals are applied to at least one of the P detection electrodes in two signal driving periods.

13. A signal driving apparatus, comprising:

a signal driving module, configured to:

in a first signal driving period, apply non-inverting drive signals to M adjacent detection electrodes and apply inverting drive signals to N adjacent detection electrodes different from the M adjacent detection electrodes, wherein M+N≤P and the M adjacent detection electrodes and the N adjacent detection electrodes are all part of P detection electrodes, wherein M and N are natural numbers and P is a number of detection electrodes not greater than a number of detection electrodes on a touch control screen; and in a second signal driving period, apply non-inverting drive signals to K adjacent detection electrodes and apply inverting drive signals to L adjacent detection electrodes different from the K adjacent detection electrodes, wherein K+L≤P and the K adjacent detection electrodes and the L adjacent detection electrodes are all part of the P detection electrodes, wherein K and L are natural numbers;

wherein:

one signal driving cycle comprises at least two signal driving periods in which drive signals are applied to P detection electrodes, the at least two signal driving periods including the first signal driving period and the second signal driving period;

each of the P detection electrodes is applied a non-inverting drive signal at least once in one signal driving cycle; and phases of the inverting drive signals are opposite to phases of the non-inverting drive signals by 180 degrees.

14. The signal driving apparatus according to claim 13, wherein the detection electrodes are horizontal detection electrodes or longitudinal detection electrodes, and P denotes a number of the horizontal detection electrodes or a number of the longitudinal detection electrodes.

15. The signal driving apparatus according to claim 13, wherein $|M-N|\leq Q$, $|K-L|\leq Q$, wherein Q denotes a number of detection electrodes with which no moire is caused after cancellation between the non-inverting drive signals and the inverting drive signals.

16. The signal driving apparatus according to claim 13, wherein $M-N=K-L$.

17. The signal driving apparatus according to claim 13, wherein:

in the first signal driving period, the non-inverting drive signals applied to the M adjacent detection electrodes and the inverting drive signals applied to the N adjacent detection electrodes cancel each other out; and in the second signal driving period, the non-inverting drive signals applied to the K adjacent detection electrodes and the inverting drive signals applied to the L adjacent detection electrodes cancel each other out.

18. The signal driving apparatus according to claim 13, wherein non-inverting drive signals are applied to at least one of the P detection electrodes in two signal driving periods.

19. A signal driving apparatus comprising a signal driving module configured to perform the signal driving method according to claim 7.

20. A touch control chip comprising a signal driving apparatus including a signal driving module configured to perform the signal driving method according to claim 1.

* * * * *